United States Patent
Thornhill et al.

(10) Patent No.: US 12,373,559 B1
(45) Date of Patent: Jul. 29, 2025

(54) SECURE ARCHIVE EXPLORER

(71) Applicant: Menlo Security, Inc., Mountain View, CA (US)

(72) Inventors: Stephen John Stanley Thornhill, Chalfont St. Giles (GB); Michael Leslie Gardner, Bristol (GB); Todd Ignasiak, Mountain View, CA (US); David Jonathan Lee, Reading (GB)

(73) Assignee: Menlo Security, Inc., Mountain View, CA (US)

( * ) Notice: Subject to any disclaimer, the term of this patent is extended or adjusted under 35 U.S.C. 154(b) by 0 days.

(21) Appl. No.: 18/479,666

(22) Filed: Oct. 2, 2023

Related U.S. Application Data

(60) Provisional application No. 63/412,712, filed on Oct. 3, 2022.

(51) Int. Cl.
| | | |
|---|---|---|
| *G06F 21/56* | (2013.01) | |
| *G06F 16/11* | (2019.01) | |
| *G06F 21/60* | (2013.01) | |

(52) U.S. Cl.
CPC ......... *G06F 21/565* (2013.01); *G06F 16/113* (2019.01); *G06F 21/602* (2013.01); *G06F 2221/034* (2013.01)

(58) Field of Classification Search
CPC .... G06F 21/565; G06F 21/602; G06F 16/113; G06F 2221/034
See application file for complete search history.

(56) References Cited

U.S. PATENT DOCUMENTS

| | | |
|---|---|---|
| 8,356,357 B1 | 1/2013 | Barile |
| 8,429,429 B1 | 4/2013 | Kargman |
| 8,726,396 B1 | 5/2014 | Dodke |
| 8,825,748 B2 | 9/2014 | Sng |
| 8,918,867 B1 | 12/2014 | Salour |
| 9,374,374 B2 | 6/2016 | Steinberg |
| 9,391,832 B1 | 7/2016 | Song |
| 9,887,970 B2 | 2/2018 | Luff |
| 10,958,732 B1* | 3/2021 | Procopio ................ H04L 67/10 |
| 11,005,819 B1 | 5/2021 | Song |
| 2010/0146600 A1 | 6/2010 | Eldar |
| 2012/0051657 A1 | 3/2012 | Lamanna |
| 2012/0096122 A1* | 4/2012 | Zhu ...................... H04L 67/06 709/219 |
| 2013/0061284 A1 | 3/2013 | Berengoltz |
| 2014/0019753 A1 | 1/2014 | Lowry |

(Continued)

OTHER PUBLICATIONS

Alkilani et al., Data Exfiltration Techniques and Data Loss Prevention System, 2019 International Arab Conference on Information Technology (ACIT), 2019, pp. 124-127, doi: 10.1109/ACIT47987.2019.8991131 (Year: 2019).

*Primary Examiner* — Sangseok Park

(74) *Attorney, Agent, or Firm* — Amsel IP Law PLLC; Jason Amsel

(57) ABSTRACT

A secure archive explorer is disclosed. A determination is made that a user has selected, from an interface, an archive comprising at least one file. A determination is made that at least one of the selected archive or a subcomponent of the archive is encrypted. In response to determining that the at least one of the selected archive or subcomponent of the selected archive is encrypted, the user is prompted for a credential. Based at least in part on the user's response to the prompt, an action is taken.

14 Claims, 37 Drawing Sheets

(56) References Cited

U.S. PATENT DOCUMENTS

| | | |
|---|---|---|
| 2015/0095645 A1* | 4/2015 | Eldar .................. H04L 63/0485 |
| | | 713/168 |
| 2017/0041296 A1 | 2/2017 | Ford |
| 2017/0048252 A1 | 2/2017 | Straub |
| 2017/0063883 A1 | 3/2017 | Franzoni Martinez |
| 2017/0099344 A1 | 4/2017 | Hadfield |
| 2017/0235965 A1 | 8/2017 | Balinsky |
| 2017/0264619 A1 | 9/2017 | Narayanaswamy |
| 2017/0302635 A1* | 10/2017 | Humphries ............. H04L 51/08 |
| 2018/0316674 A1 | 11/2018 | Shaked |
| 2019/0075130 A1 | 3/2019 | Petry |
| 2019/0213342 A1 | 7/2019 | Acharya |
| 2019/0289371 A1* | 9/2019 | Mok ....................... G06F 16/00 |
| 2020/0042837 A1 | 2/2020 | Skinner |
| 2020/0106842 A1 | 4/2020 | Chauhan |
| 2020/0186343 A1* | 6/2020 | Stuntebeck ......... H04L 67/1097 |
| 2020/0267167 A1 | 8/2020 | Venkataswami |
| 2020/0404000 A1* | 12/2020 | Hayes ................. H04L 63/1483 |
| 2021/0200866 A1* | 7/2021 | Strogov ................ G06F 21/568 |
| 2021/0377219 A1 | 12/2021 | Finchelstein |
| 2021/0377303 A1 | 12/2021 | Bui |
| 2021/0377304 A1 | 12/2021 | Ma |
| 2023/0110049 A1* | 4/2023 | Bhalerao ............... G06F 21/554 |
| | | 726/22 |
| 2023/0247238 A1* | 8/2023 | Ganesan ............ H04N 21/2347 |
| | | 725/143 |

* cited by examiner

FIG. 10

Edit DLP Rule

| DLP Rule | RULE DETAILS | |
|---|---|---|
| Content Types | Rule Name | Block CreditCard Uploads |
| Criteria | Description | Enter Description |
| Action | User Notification (Displayed on block pages) | You have attempted to submit protected corporate content to an Internet WWW site that is not approved by corporate policy. |
| Dictionaries / Groups | | |

[Cancel] [< Back] [Next >] [Save]

FIG. 11

| Edit DLP Rule | | ✕ |
|---|---|---|
| DLP Rule | | |
| Content Types | USER INPUT INSPECTION | |
| Criteria | User input will be passed through DLP inspection when network submissions are requested. If DLP inspection generates a policy block, the tab is blocked from network access and the user is notified. | |
| Action | ⦿ Inspect Text Inputs | |
| Dictionaries / Groups | FILE UPLOAD INSPECTION | |
| | Files being uploaded will be passed through DLP inspection. If DLP inspection generates a policy block, the upload is blocked and the user is notified. | |
| | Maximum File Size [ 50 ] [ MB ˅ ] | |
| | ⦿ Inspect All File Types | |
| | [Cancel] [< Back] [Next >] [Save] | |

FIG. 12

Edit DLP Rule

| DLP Rule | |
|---|---|
| Content Types | |
| Criteria | USERS AND GROUPS |
| Action | ◉ All Users |
| Dictionaries / Groups | List of Users — Enter users(s) |
| | List of Groups — [finance dept ×] [marketing dept ×] |
| | Enter groups(s) |
| | DOMAINS |
| | Domains (optional) — dropbox.com dlptest.com box.com |
| | CATEGORIES |
| | Categories (optional) — Add Categories |

Cancel  < Back  Next >  Save

FIG. 13

Edit DLP Auditor Profile

AUDITOR DETAILS

Auditor Name     DLPAdmins

Description     DLP Admin Auditors team

AUDITORS AND FILE DETAILS

Email Addresses     bob@example.com   charlie@example.com

Enter Email Address(es)

Send File

File Format     Encrypted ZIP File

Encrypted ZIP Password     Generate Password

FIG. 14

| Edit DLP Rule | |
|---|---|
| DLP Rule | |
| Content Types | |
| Criteria | |
| Action | ACTION |
| Dictionaries / Groups | Action ⊙ Block ⌄ |
| | Send Audit Email ◯ |
| | Select Auditors [ DLPAdmins × Add Auditors ] |

[Cancel] [< Back] [Next >] [Save]

FIG. 15

Edit DLP Rule — 1600

| DLP Rule | |
|---|---|
| Content Types | |
| Criteria | |
| Action | |
| Dictionaries / Groups | |

DLP GROUPS / DICTIONARIES

Credit | All Types ˅ | All Categories ˅ | All Regions ˅ | Clear 13 items selected  1-10 of 23

| Name ▲ | Type | Category | Region |
|---|---|---|---|
| Credit card magnetic track 1 [Global] | Predefined Dictionary | Financial Data, PCI DSS | Global |
| Credit card magnetic track 2 [Global] | Predefined Dictionary | Financial Data, PCI DSS | Global |
| Credit card number - with phrases [Global] | Predefined Dictionary | Personally Identifiable Information, Financial Data, PCI DSS | Global |
| Credit card numbers [Global] | Predefined Dictionary | Personally Identifiable Information, Financial Data, PCI DSS | Global |
| Credit or debit card numbers near personally identifi... | Predefined Dictionary | Personally Identifiable Information, Financial Data, PCI DSS | Belgium |
| Credit or debit card numbers near personally identifi... | Predefined Dictionary | Personally Identifiable Information, Financial Data, PCI DSS | Finland |
| Credit or debit card numbers near personally identifi... | Predefined Dictionary | Personally Identifiable Information, Financial Data, PCI DSS | Hong Kong |
| Credit or debit card numbers near personally identifi... | Predefined Dictionary | Personally Identifiable Information, Financial Data, PCI DSS | India |
| Credit or debit card numbers near personally identifi... | Predefined Dictionary | Personally Identifiable Information, Financial Data, PCI DSS | Singapore |

Cancel | < Back | Next > | Save

Index of /test-files/files_for_manual/packaged_files/

| | | |
|---|---|---|
| ../ | | |
| CI-4159/ | 04-Aug-2021 04:55 | - |
| CI-6964/ | 23-Jul-2021 05:10 | - |
| CI-6970/ | 23-Jul-2021 01:55 | - |
| CI-7094/ | 05-Oct-2021 21:20 | - |
| CI-7142-DocuSign/ | 17-May-2022 01:00 | - |
| CI-7236/ | 16-May-2022 23:45 | - |
| CI-7251/ | 15-Jul-2021 00:50 | - |
| CI-7261/ | 28-Jul-2021 00:25 | - |
| CI-7322/ | 17-Feb-2022 03:45 | - |
| CI-7484/ | 15-Jul-2021 03:35 | - |
| CI-7496/ | 30-Jul-2021 18:30 | - |
| CI-7497/ | 23-Jul-2021 05:25 | - |
| CI-7758/ | 16-May-2022 22:00 | - |
| CI-8058/ | 16-May-2022 21:30 | - |
| CI-8152/ | 16-May-2022 04:30 | - |
| CI-8177/ | 28-Apr-2022 01:35 | - |
| big_files_2/ | 10-Jan-2022 18:25 | - |
| large_files/ | 16-Jul-2020 20:40 | - |
| 10MB_mixed_docs.zip | 30-Mar-2022 05:42 | 7895589 |
| 10MB_mixed_with_corrupted_docs.zip | 30-Mar-2022 05:41 | 8330851 |
| 10MB_ms_documents.zip | 30-Mar-2022 04:27 | 9951638 |
| 1G.zip | 17-Jul-2020 19:57 | 1077576050 |
| 1GB_encrypted_clean.zip | 17-Jul-2020 19:57 | 1073915687 |
| 3MB_doc.zip | 18-Sep-2021 03:23 | 932285 |
| 7z_m_encrypted_clean.7z | 03-Aug-2021 00:06 | 194815 |
| 7z_â'â¹âfîâ¹âf¨âf•â¸iâ¸‹¤âf«â¤¹æ¬-t.7z | 06-Jun-2022 03:47 | 199220 |
| CI-5316-special_char_Expense.7z | 28-Sep-2020 20:00 | 43397 |
| CI-5316-test_!_.zip | 28-Sep-2020 19:58 | 429685 |
| CI-5316-test_@_.zip | 28-Sep-2020 19:41 | 429769 |
| CI-5316-test_special_char_subfiles.zip | 28-Sep-2020 20:00 | 429805 |
| CI-5318-special_char_Expense.7z | 28-Sep-2020 19:58 | 43397 |
| CI-5959-Week-8-NLP-Databases.zip | 25-Sep-2020 21:32 | 325284 |
| CI-7869-Windows8_1-KB2919355-x86.msu | 20-May-2022 13:48 | 3345171759 |
| Expense.7z | 28-Sep-2020 18:43 | 43397 |
| ZIPâfâ¸iâ¸‹¤âf«_1.zip | 24-Jun-2021 02:11 | 159625 |
| all_docm.zip | 31-Mar-2022 05:34 | 77943 |
| ari.ari | 08-Mar-2020 18:20 | 344393 |
| ari_â'â¹âfîâ¹âf¨âf•â¸iâ¸‹¤âf«â¤¹æ¬-t.ari | 08-Mar-2020 03:47 | 199106 |
| book1_corrupted.pdf | 06-Jun-2022 22:18 | 435000 |
| bz2.bz2 | 08-Mar-2020 18:20 | 320468 |

2502 safe.menlosecurity.com/http://test-pages.menlotest.com/test-files/files_for_manual/packaged_files/

Index of /test-files/files_for_manual/packaged_files/

| | | | |
|---|---|---|---|
| ../ | | | |
| CI-4159/ | 04-Aug-2021 | 04:55 | - |
| CI-6964/ | 23-Jul-2021 | 05:10 | - |
| CI-6970/ | 23-Jul-2021 | 01:55 | - |
| CI-7094/ | 05-Oct-2021 | 21:20 | - |
| CI-7142-DocuSign/ | 17-May-2022 | 01:00 | - |
| CI-7238/ | 16-May-2022 | 23:45 | - |
| CI-7251/ | 15-Jul-2021 | 00:50 | - |
| CI-7261/ | 28-Jul-2021 | 00:25 | - |
| CI-7322/ | 17-Feb-2022 | 03:45 | - |
| CI-7484/ | 15-Jul-2021 | 03:35 | - |
| CI-7496/ | 30-Jul-2021 | 18:30 | - |
| CI-7497/ | 23-Jul-2021 | 05:25 | - |
| CI-7758/ | 16-May-2022 | 22:00 | - |
| CI-8058/ | 16-May-2022 | 21:30 | - |
| CI-8152/ | 16-May-2022 | 04:30 | - |
| CI-8177/ | 28-Apr-2022 | 01:35 | - |
| big_files_2/ | 10-Jan-2022 | 18:25 | - |
| large_files/ | 16-Jul-2020 | 20:40 | - |
| 10MB_mixed_docs.zip | 30-Mar-2022 | 05:42 | 7895589 |
| 10MB_mixed_with_corrupted_docs.zip | 30-Mar-2022 | 05:41 | 8330851 |
| 10MB_ms_documents.zip | 30-Mar-2022 | 04:27 | 9951638 |
| 1G.zip | 17-Jul-2020 | 19:57 | 1077576050 |
| 1GB_encrypted_clean.zip | 17-Jul-2020 | 19:57 | 1073915887 |
| 3MB_doc.zip | 18-Sep-2021 | 03:23 | 932285 |
| 7z_m_encrypted_clean.7z | 03-Aug-2021 | 00:06 | 194815 |
| 7z_ã¸ã¸ã¸ã¸ãƒ¸ã¸ãƒ¸ãƒ»ã¸ã¸ã¸ã¸ãƒ¸ã¸ãƒ¸ã¸ãƒ»ã¸ã¸ãƒ»æ¯ƒ7z | 06-Jun-2022 | 03:47 | 199220 |
| CI-5316-special_char_Expense.7z | 28-Sep-2020 | 20:00 | 43397 |
| CI-5316-test !.zip | 28-Sep-2020 | 19:58 | 429885 |
| CI-5316-test !_@_.zip | 28-Sep-2020 | 19:41 | 429769 |
| CI-5318-special_char_subfiles.zip | 28-Sep-2020 | 20:00 | 429805 |
| CI-5318-special_char_Expense.7z | 28-Sep-2020 | 19:58 | 43397 |
| CI-5959-Week-8-NLP-Databases.zip | 25-Sep-2020 | 21:32 | 325284 |
| CI-7869-Windows9_1-KB2919355-x86.msu | 20-May-2022 | 13:48 | 3345171159 |
| Expense.7z | 28-Sep-2020 | 18:43 | 43397 |
| ZIPãƒ¸ãƒ»ã¸ã¸ãƒ¸ã¸ã¸ãƒ¸ã¸ãƒ¸ãƒ¸ãƒ¸_1.zip | 24-Jun-2021 | 02:11 | 159625 |
| all_docm.zip | 31-Mar-2022 | 05:34 | 77943 |
| arj.arj | 08-Mar-2022 | 18:20 | 344393 |
| arjã¸ã¸ã¸ãƒ¸ãƒ¸ã¸ã¸ãƒ¸ãƒ¸ã¸ã¸ã¸ã¸ã¸ãƒ»ã¸ã¸ã¸ã¸ãƒ»æ¯æƒ»æ¯ƒæ¯ƒarj | 08-Mar-2022 | 18:20 | 199106 |
| book1_corrupted.pdf | 06-Jun-2022 | 03:47 | 435000 |
| bz2.bz2 | 22-Dec-2020 | 22:18 | 320468 |

FIG. 26

| | |
|---|---|
| https://safe.menlosecurity.com/http://test-pages.menlotest.com/test-files/files_for_manual/packaged_files/ | |
| arj.arj | 08-Mar-2020 18:20  344393 |
| arj_ā·āfĪā·āfĪāf•ā·iā·ūāfĸā¹ºæ-ł.arj | 08-Jun-2022 03:47  199106 |
| book1_corrupted.pdf | 22-Dec-2020 22:18  435000 |
| bz2.bz2 | 08-Mar-2020 18:20  320468 |
| bzip_ā·āʼiāfĪā·āfĪā·fā·ā·iā·ūāfĸā¹ºæ-ł.tar.bz2 | 06-Jun-2022 03:47  200297 |
| cab.cab | 08-Mar-2020 18:20  145478 |
| child_in_sub_dir.zip | 02-Aug-2021 21:38  610745 |
| child_in_sub_dirs.zip | 02-Aug-2021 21:47  13298 |
| child_relative_path.zip | 02-Aug-2021 22:00  17994 |
| clean_gzip.tar.gz | 02-Jun-2022 04:43  71378 |
| corrupted_pdf.zip | 04-Aug-2021 00:10  1311760 |
| debian-10_9_0-amd64-netinst.iso | 28-May-2021 23:46  353370112 |
| empty.zip | 05-Aug-2021 23:56  162 |
| empty_pdf.zip | 05-Aug-2021 23:56  174 |
| encrypt_encrypt_sub_file.zip | 02-Apr-2020 02:55  4395862 |
| encrypted_1_2_3.zip | 09-Sep-2021 01:54  238817 |
| encrypted_1_2_3_4.zip | 09-Sep-2021 02:18  239033 |
| encrypted_1_subfile.rar | 07-Apr-2020 02:47  22729 |
| encrypted_2_level.zip | 03-Aug-2021 04:42  245705 |
| encrypted_2_subfiles.zip | 05-Apr-2021 18:06  1750219 |
| encrypted_3_sub_files.7z | 06-Apr-2020 23:18  4608364 |
| encrypted_Eicar_subfiles.7z | 07-Apr-2020 03:38  220822 |
| encrypted_mixed_child_archives.zip | 09-Sep-2021 01:54  338998 |
| encrypted_root_child_zip_with_unknown_files.zip | 10-Sep-2021 04:33  1589752 |
| encrypted_root_en_level2_encrypted_office.zip | 04-Aug-2021 00:57  70823 |
| encrypted_root_encrypted_documents.zip | 09-Sep-2021 00:43  44797 |
| encrypted_root_encrypted_office.zip | 04-Aug-2021 00:55  33912 |
| encrypted_root_encrypted_xls_pdf_doc.zip | 09-Sep-2021 01:05  238559 |
| encrypted_root_japanese_files.zip | 08-Dec-2021 19:22  51951 |
| encrypted_root_plain_docs_files.zip | 04-Sep-2021 00:48  61119 |
| encrypted_root_plain_word.zip | 04-Aug-2021 00:55  110634 |
| encrypted_root_subfiles_plain_documents.zip | 21-Jul-2021 20:55  610719 |
| encrypted_root_subfiles_plain_files.zip | 21-Jul-2021 20:55  31611286 |
| encrypted_root_subfiles_plain_ms_office.zip | 21-Jul-2021 20:59  110724 |
| encrypted_root_subfiles_unknown.zip | 21-Jul-2021 21:07  1589674 |
| encrypted_sub_file.tar | 06-Apr-2020 23:46  559104 |
| encrypted_sub_file.zip | 26-May-2020 00:31  480312 |
| encrypted_sub_files.tar.bz2 | 20-May-2020 06:42  4722858 |
| encrypted_subfile_7z.zip | 06-Apr-2020 23:05  4544500 |
| encrypted_subfiles_7z_word.7z | 07-Apr-2020 02:47  4731533 |
| encrypted_subfiles_multiple_type.rar | 06-Apr-2020 23:27  4522262 |
| encrypted_subfiles_multiple_type.tar.gz | 06-Apr-2020 23:46  7897677 |
| encrypted_third_encrypted_second_level.zip | 02-Aug-2021 03:54  668753 |
| gz.gz | 08-Mar-2020 18:20  318773 |

← → C 🔒 safe.menlosecurity.com/file_transfer?f14320128251768889 5bfbb93ce56381f673017bb0562b6449e9735769 5d99549

MENLO
SECURITY

①

Password Required
Name: sanity.docx
Site: test-pages.menlotest.com

This file must be inspected but is encrypted. Please input password.

②

| Password | Submit |

FIG. 35 safe.menlosecurity.com/doc/docview/viewer/docNB173E7765FEBf43201282517688895ebb93ce56381f67301 7b0562b6449e97357695d98549

MENLO SECURITY  encrypted_root_encrypted_documents.zip /./sanity.docx        3504

3502 ✓ Content scan completed  ⓘ          ⬇ Download Original
                                          📄 Safe Download (PDF)
                                                    3506

August 23: Day of Remembrance for Victims of Stalinism and Nazism/Black Ribbon Day in Canada, parts of the European Union, Georgia, and the United States German tanks and soldiers in the Battle of Kursk

- 1514- Ottoman forces defeated the Safavids at the Battle of Chaldiran, gaining control of eastern Anatolia and northern Iraq.
- 1898- The Southern Cross Expedition, the first British venture of the Heroic Age of Antarctic Exploration, departed from London.
- 1921- The Royal Navy's R-38, the world's largest airship at the time, was destroyed by a structural failure while in flight over Hull, killing 44 of the 49 crew aboard.
- 1943- Second World War: The decisive Soviet victory in the Battle of Kursk (German tanks and soldiers pictured) gave the Red Army the strategic initiative for the rest of the war.
- 2011- A 5.8$M_W$ earthquake struck the Piedmont region of Virginia, and was felt by more people than any other quake in U.S. history.

⊖ 100% ⊕

SECURE ARCHIVE EXPLORER

This application claims priority to U.S. Provisional Patent Application No. 63/412,712 entitled SECURE ARCHIVE EXPLORER filed Oct. 3, 2022 which is incorporated herein by reference for all purposes.

BACKGROUND OF THE INVENTION

One way that nefarious individuals perpetrate computer attacks is by compromising files hosted at a website. An unsuspecting user visiting such a website with a client browser may unwittingly download one or more of those files and open them on their endpoint computer. Unfortunately, while various techniques for mitigating some risk exist, such as anti-virus scanners installed at the endpoint, there are ways of circumventing/evading their protections. There is thus an ongoing need to provide new ways of preventing computer attacks.

BRIEF DESCRIPTION OF THE DRAWINGS

Various embodiments of the invention are disclosed in the following detailed description and the accompanying drawings.

FIG. 10 illustrates an example of an interface.
FIG. 11 illustrates an example of an interface.
FIG. 12 illustrates an example of an interface.
FIG. 13 illustrates an example of an interface.
FIG. 14 illustrates an example of an interface.
FIG. 15 illustrates an example of an interface.
FIG. 16 illustrates an example of an interface.
FIG. 18 illustrates an example of an interface.
FIG. 25 illustrates an example of a user browsing a website that includes a variety of downloadable files.
FIG. 26 illustrates an example of the user visiting a website using a surrogate browsing system.
FIG. 27 illustrates an example of the user visiting a website using a surrogate browsing system.
FIG. 33 illustrates an example of the user visiting a website using a surrogate browsing system.
FIG. 34 illustrates an example of the user visiting a website using a surrogate browsing system.
FIG. 35 illustrates an example of the user visiting a website using a surrogate browsing system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Example Environment

Figure 1:
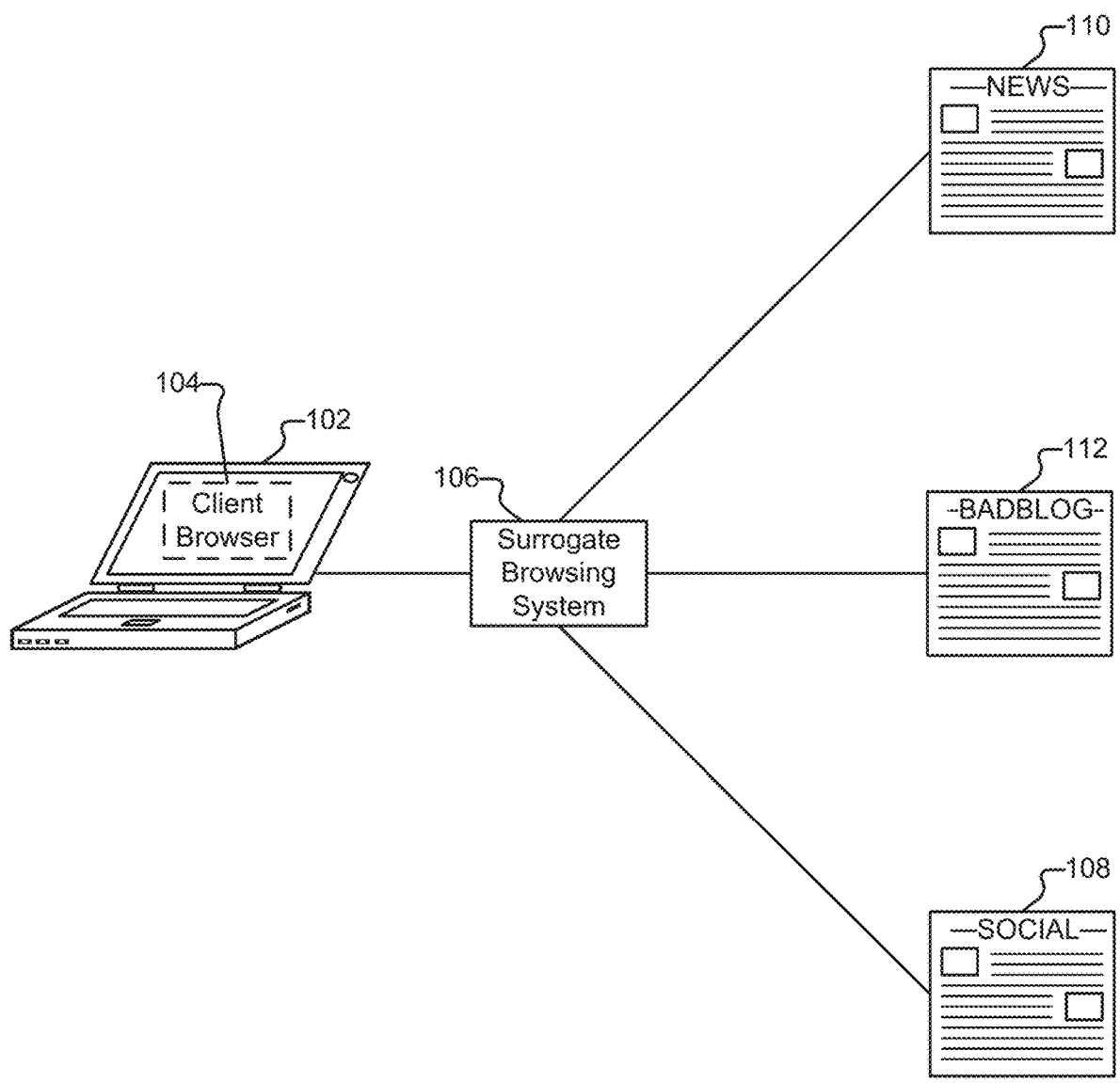
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links-resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed—located at data centers around the world.

Figure 2A:
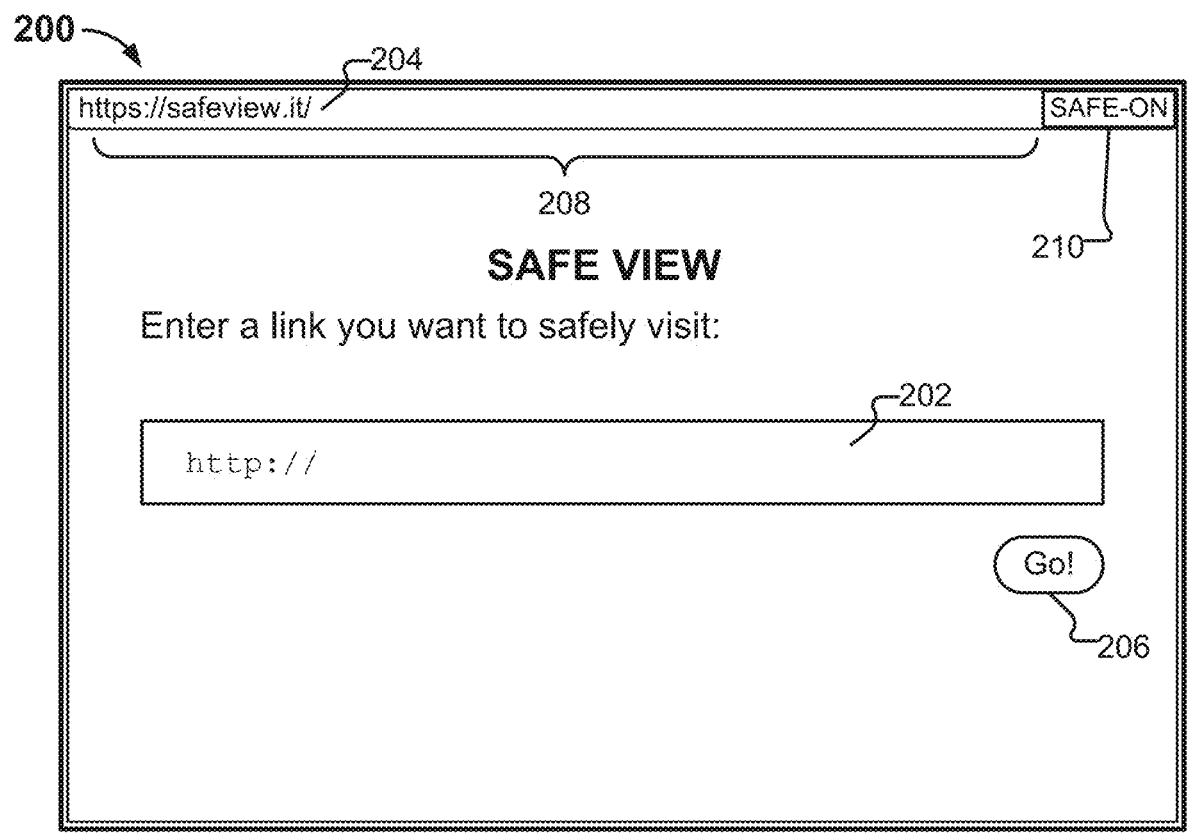
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://examplenews.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
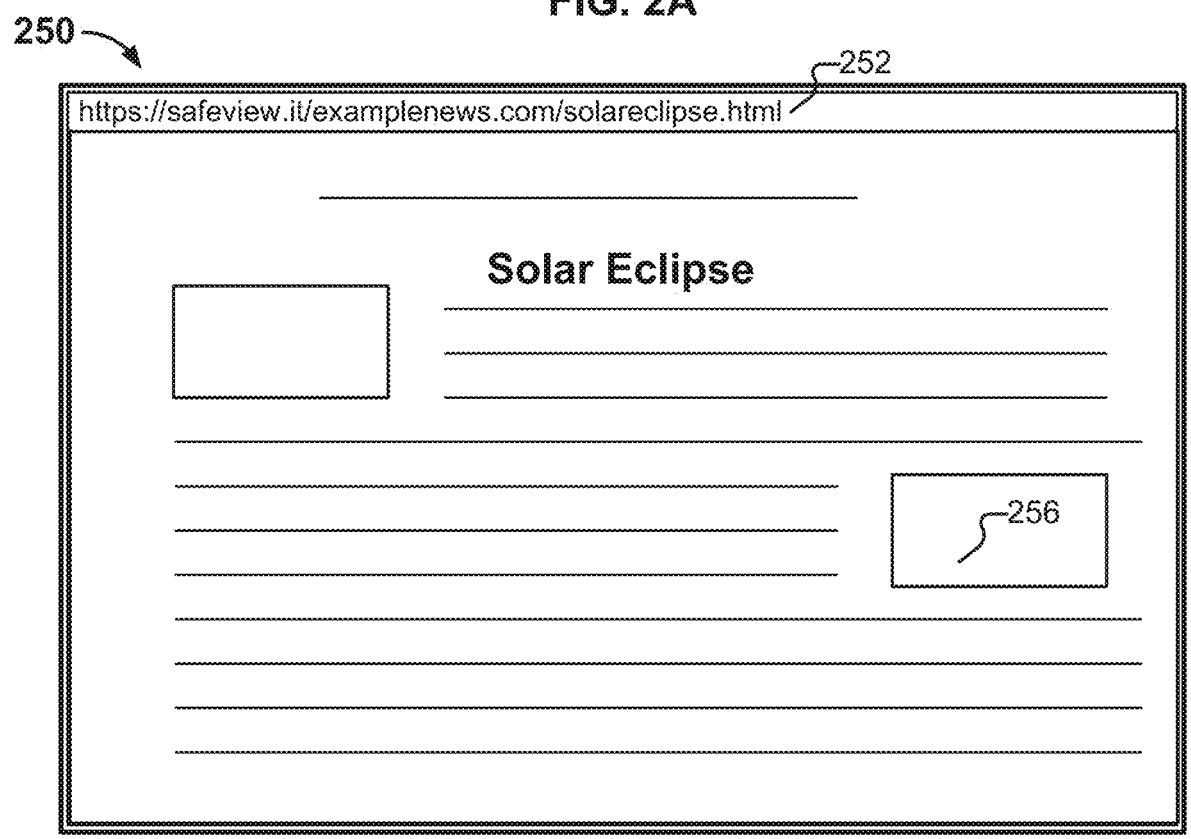
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "example-news.com/solareclipse.html" directly with her browser. As will be described in more detail below, system 106 has fetched the content from site 110 on behalf of Alice, and has processed the received content to generate a representation of the content that is then provided by system 106 to client 102. Also, as will be described in more detail below, surrogate browsing system 106 can be configured in a variety of ways and use a variety of techniques to transform the content it receives (e.g., from site 110) prior to transmitting a representation of the content to client 102.

Figure 3:
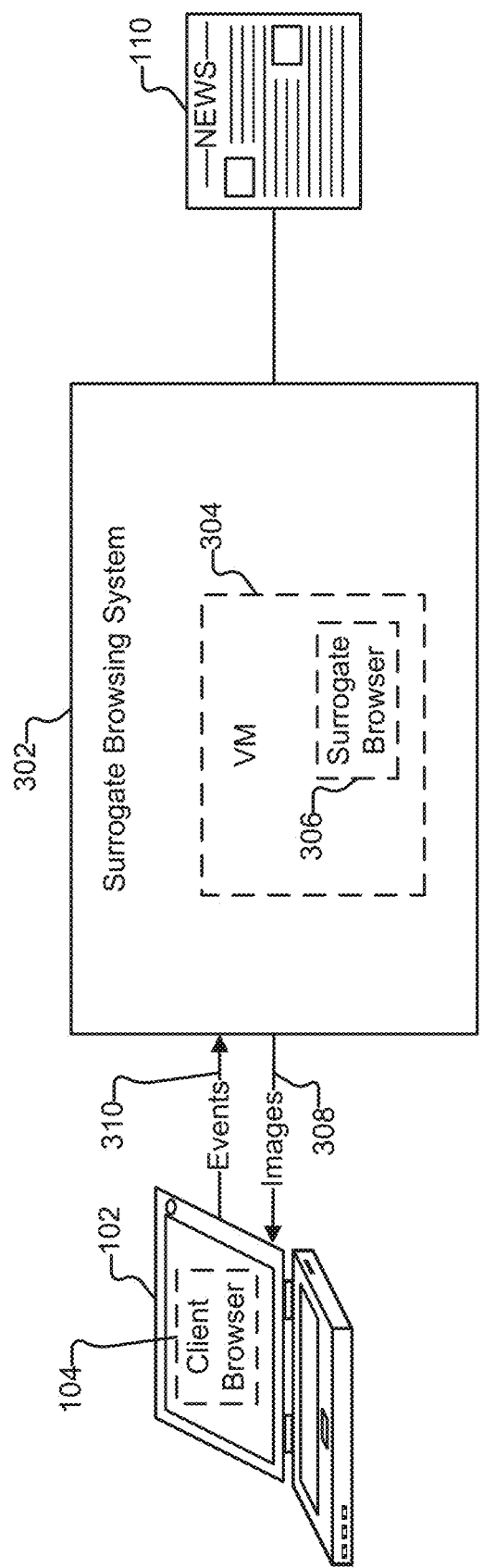
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components-a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
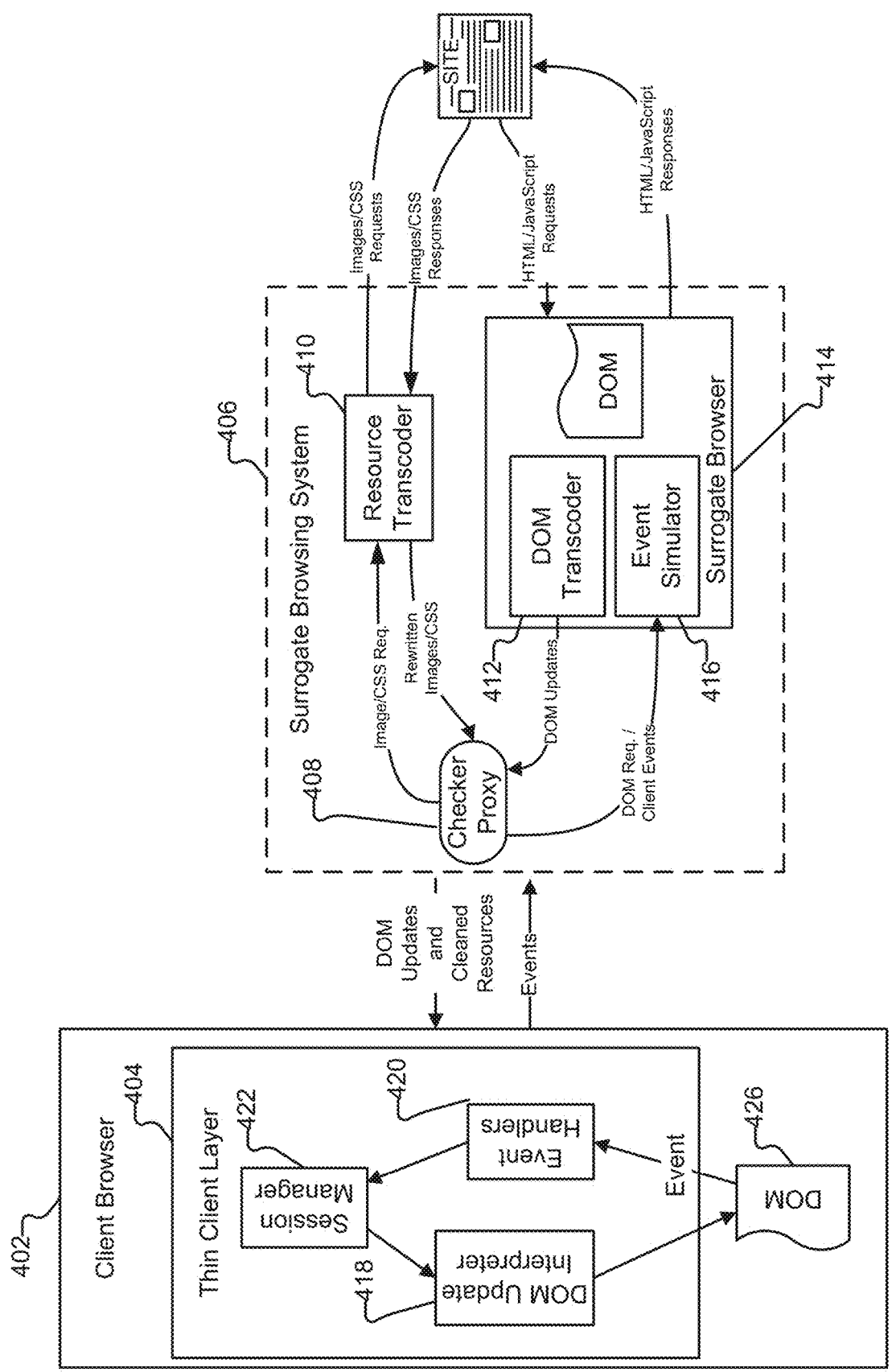
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

A. Surrogate Browsing System 406

1. Surrogate Browser 414

Surrogate browser 414 is a Webkit-based browser (or other appropriate browser) running inside a Linux container-a lightweight and disposable sandboxing environment. The surrogate browser renders requested pages and runs JavaScript code within the pages. It also contains an event simulator component 416 that applies user interaction events (e.g., 310) received from client 102.

2. DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interactions and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

3. Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

4. Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker proxy 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker proxy 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

B. Thin Client Layer 404

The thin client layer (404) includes three logical components: a DOM update interpreter 418, client event input handler(s) 420, and a session manager 422.

1. DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

2. Event Handler(s) 420

Many modern web pages are interactive-user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

3. Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages-a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

C. Enterprise Mode

Figure 5:
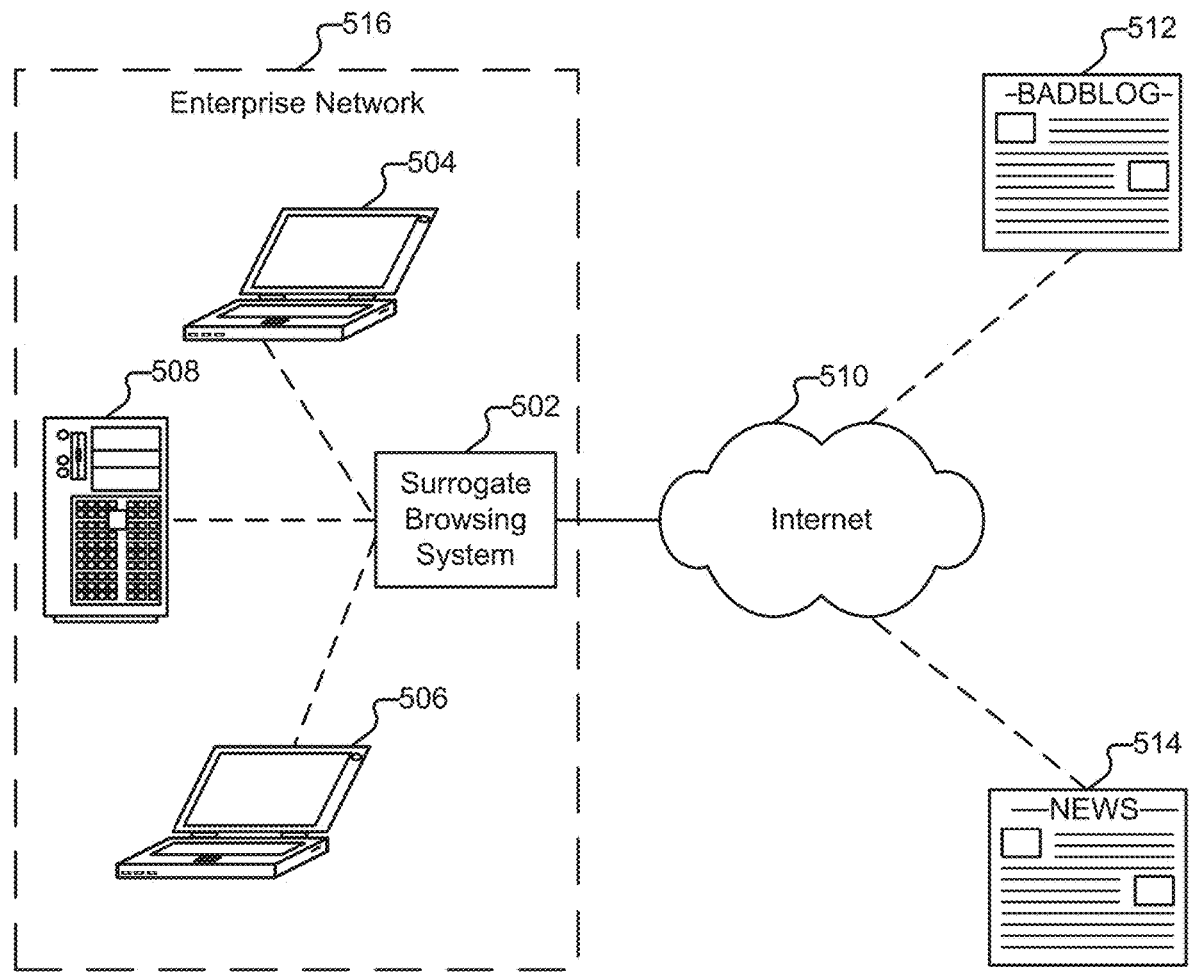
FIG. 5 illustrates an embodiment of a surrogate browsing system.

FIG. 5 illustrates an embodiment of a surrogate browsing system. In the example shown, an enterprise (e.g., the company for which a user, "Charlie," works) has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512, must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

D. Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

E. Additional Information-Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification. Unique_id and frame_id are attributes that maintain the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

DOM_add_element, "div," ["id," "example"], ["class," "mainCSS"], "123121," "245564576," "12353123," "13443253456"

DOM_modify_attribute, "123121," "id," "changed," "13443253456"

DOM_remove_element, "123121," "13443253456"

Table 2: Example of DOM update sequence. A div element is added to the DOM. Then, its id attribute is changed. Finally, the element is removed from the DOM.

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

a) DOM_inject_script, "javascript: do_bad_things( )"
b) DOM_add_element, "script," ["type," "JavaScript"], "123121," "245564576," "12353123," "13443253456"

Table 3: Example of unsuccessful attacks. In case a), the checker will not recognize a new command and classify it as a malicious activity. In case b), the checker will, using whitelists, observe that the attacker is trying to inject a script and classify it as an attack.

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

F. Example Process Used in Some Embodiments

Figure 6:
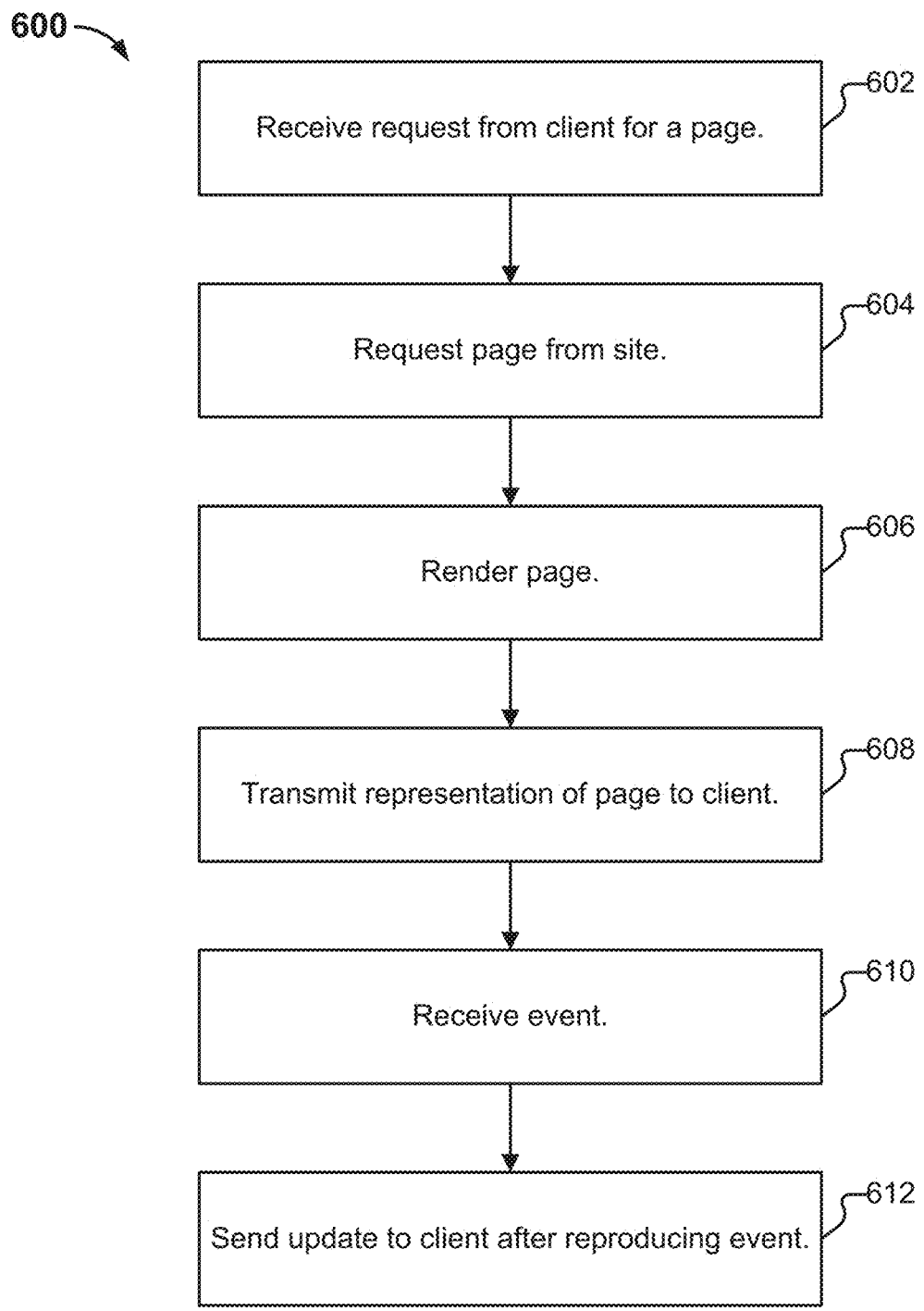
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also, as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

G. Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. Additional Example Environment

Figure 7:
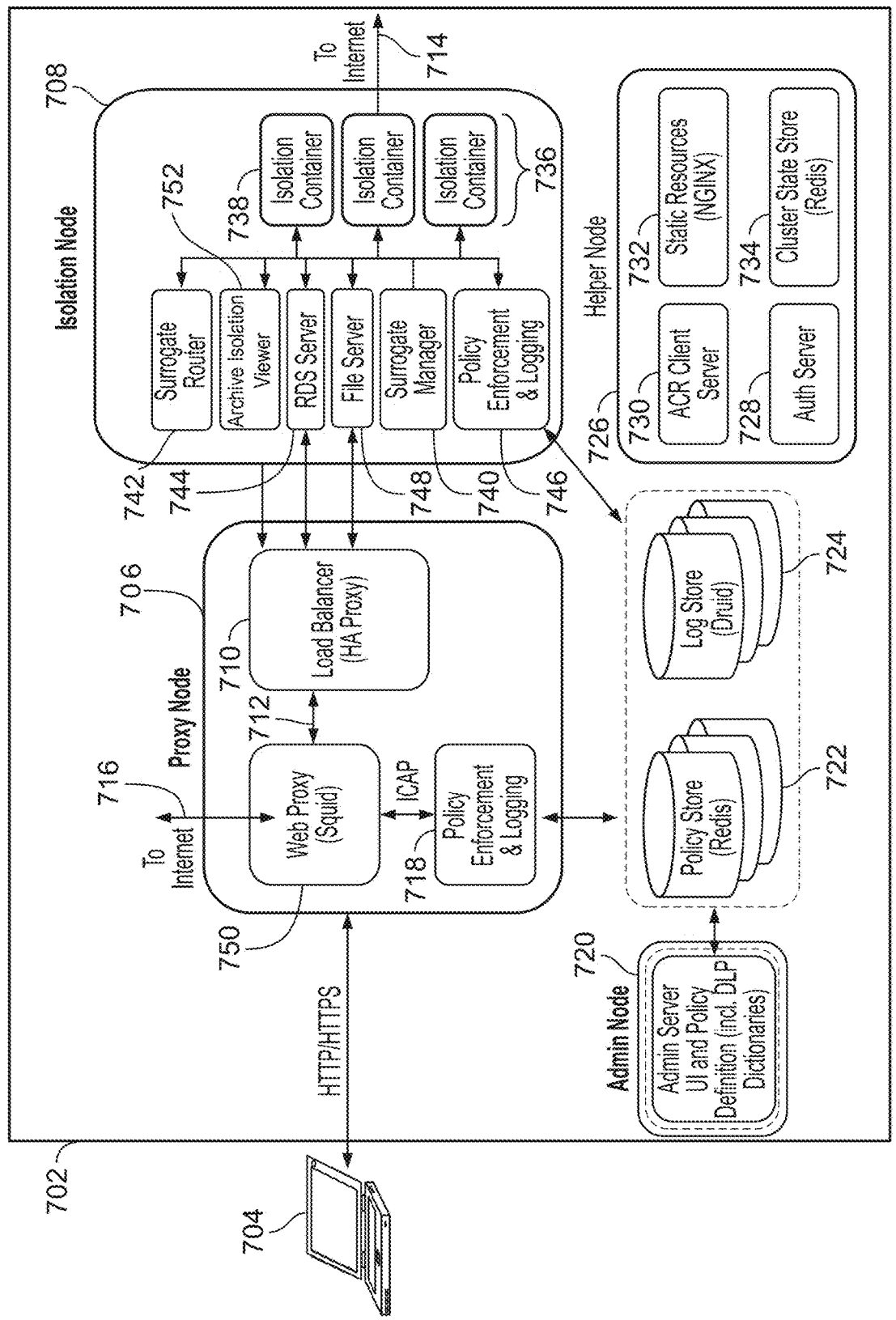
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g., each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes is configured in a separate AWS Auto Scale group to provide per-cluster elasticity as demand increases and decreases.

Proxy node 706 acts as a gateway to surrogate browsing system 702. Users of surrogate browsing system 702 (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable, proxy node 706 can be configured to provide data loss (or leak) prevention (DLP) services to traffic associated with client 704. This can be helpful, e.g., where client 704's traffic exits to the Internet via path 716, rather than through isolation node 708. As will be described in more detail below, more robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, ACR client server 730 provides a copy of a thin client (stored as a static resource along with other static resources 732 such as company logos, boilerplate text, etc.) to the client browser. Finally, cluster state store 734 is responsible for maintaining/synchronizing external state (e.g., which isolation container 736 is currently assigned to a client).

Although pictured in FIG. 7 as having an isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium browser process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. Pairing and Communication Channels

Figure 8:
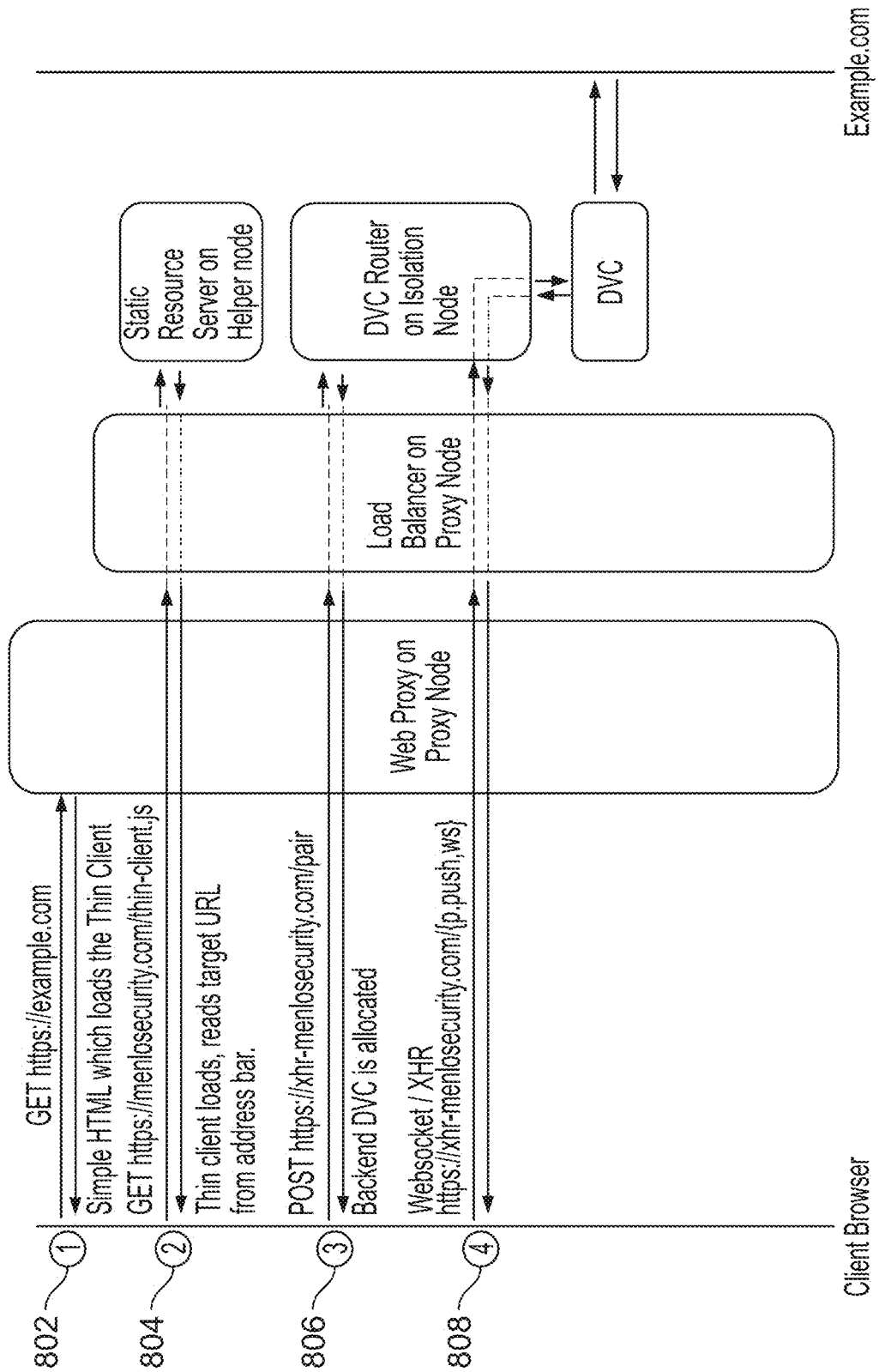
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client."

This JavaScript is loaded from helper node 726. It is the same for all visited pages and will be cached by the client browser after the first visit to any site.

Third (806), the thin client JavaScript starts executing in the client browser. The thin client consults the address bar to get the URL of the page the user wants to load and POSTs it to xhr-menlosecurity.com/pair. At this point, a Disposable Virtual Container (DVC), also referred to herein as an isolation container, is allocated for the user, if necessary. The DVC for the user is then instructed to create a tab and navigate it to example.com. The DVC starts loading example.com. At this point, no information from example. com has been sent to the client browser.

Finally (808), a communication channel with the DVC is established and information starts flowing bidirectionally to the client: rendering data flows from the DVC and user input (mouse, keyboard) flows to the DVC. This communication occurs over a websocket if a websocket can be established. Otherwise, communication occurs via multiple XHR requests.

Figure 9:
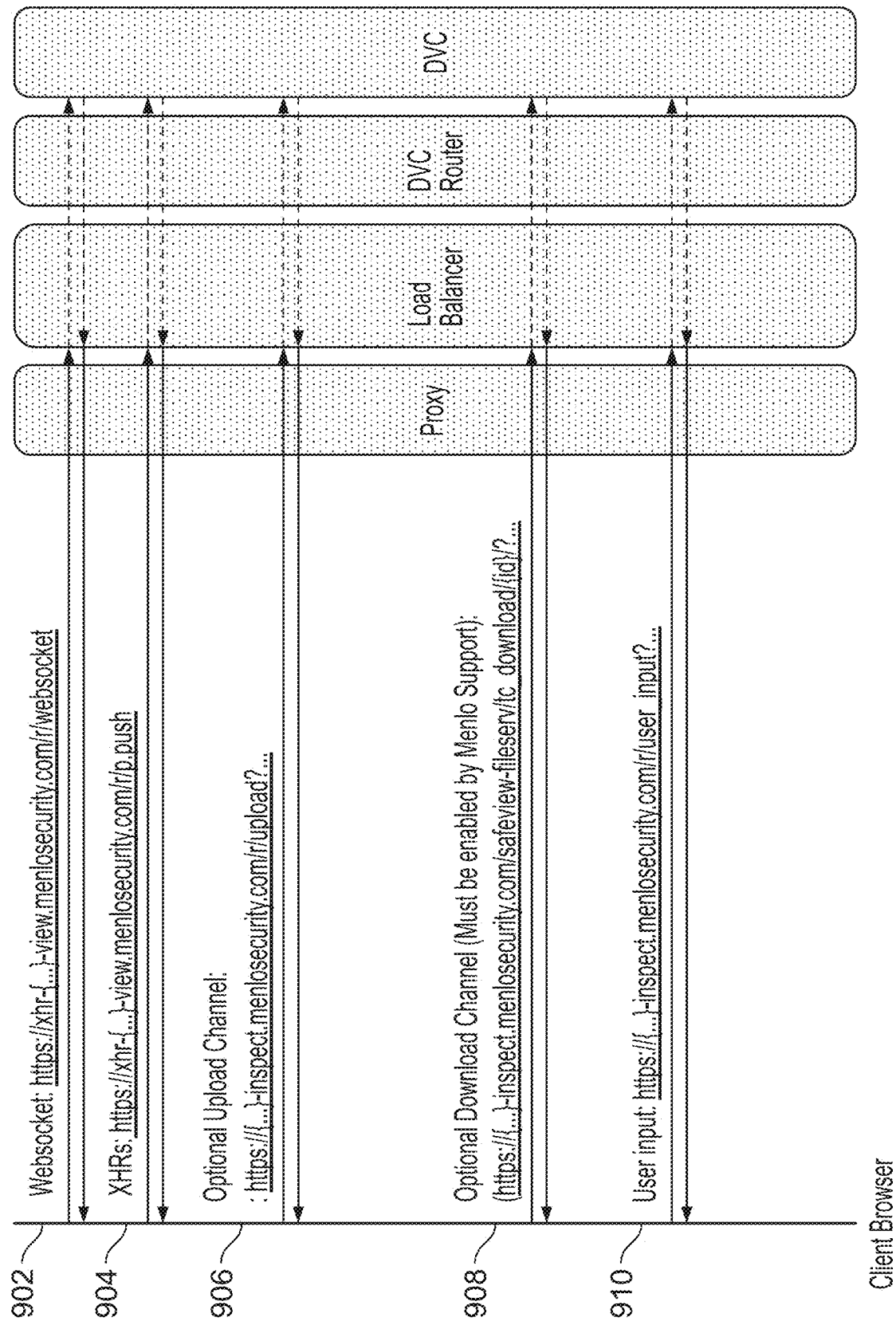
FIG. 9 illustrates different communication channels used in various embodiments.

FIG. 9 illustrates different communication channels used in various embodiments. Channel 902 is used to relay user input (mouse, keyboard) to the DVC. Channel 904 is used to relay rendering information to the client browser. As mentioned above, if possible, a websocket is used. Otherwise, XHRs are used. Channel 906 is a dedicated channel for uploads. The original destination URL (example.com) is a URL parameter (page_url). Channel 908 is a dedicated channel for downloads. The original source of the file (example.com/file.bin) is a URL parameter (file_url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. Handling Encrypted Files

In the following discussion, suppose that Alice, an employee of ACME Bank, is using surrogate browsing system 702 at work, and that ACME Bank would like to prevent (e.g., via DLP) sensitive financial and other information from being exfiltrated from the bank (e.g., via bank computers). As a specific example, suppose ACME Bank would like to prevent credit card information from being exfiltrated (e.g., in files uploaded by users).

A. Configuring DLP

Figure 10:
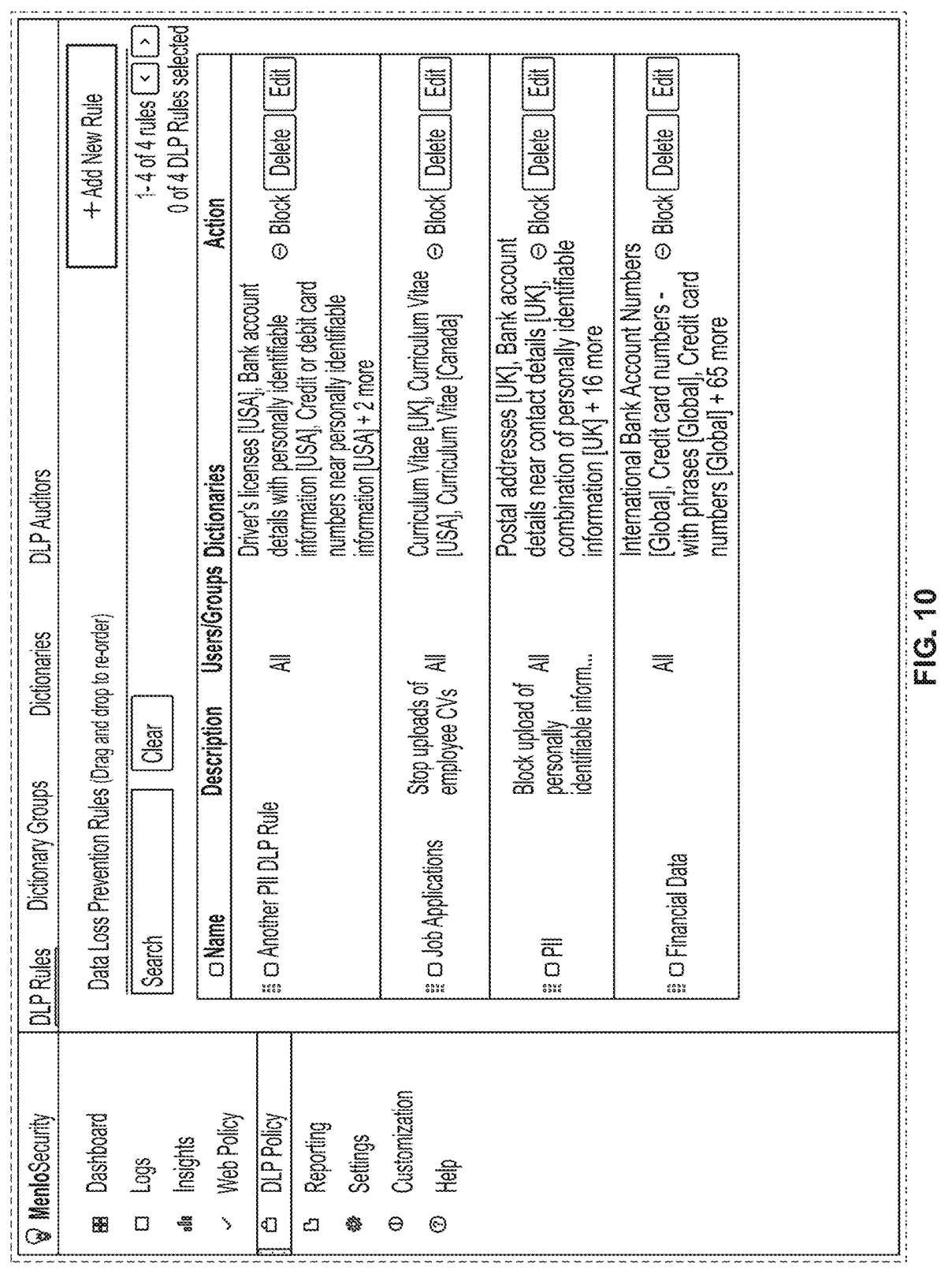
Figure 17:
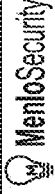
FIG. 17 illustrates an example of an interface.

In order to configure a new DLP rule for credit cards, an ACME Bank administrator first accesses a tenant administration portal served by administration node 720. An example of that interface is shown in FIG. 10. The administrator clicks on "Add New Rule" and is presented with the interface shown in FIG. 11. The administrator names the rule and specifies an end-user notification message to display. Next, the administrator specifies that the rule applies to file uploads, as shown in FIG. 12. The administrator then specifies which users/groups of users should be subject to the rule, and for which sites the rule applies, as shown in FIG. 13. As shown in FIG. 14, the administrator can create a DLP auditor profile for alerting (e.g., via email) when the rule is violated, and specify contact information for those auditors. If desired, the auditors can receive a copy of the problematic file by selecting the appropriate option in the interface. The administrator can then attach the DLP auditor profile to the DLP rule and specify what action to take upon a rule violation, such as block, allow and log/alert, etc. (as shown in FIG. 15). The administrator next specifies which dictionaries should be used to look for rule violations (e.g., text containing credit card numbers in this example) as shown in FIG. 16. The dictionaries made available in interface 1600 can comprise both custom dictionaries (e.g., of words/phrases unique to ACME such as internal product names, internal IP addresses, etc.) and more generally applicable dictionaries (e.g., made available as part of a subscription service provided by system 702 and/or a third party, as applicable). Examples of dictionaries include compliance rules, rules pertaining to particular verticals (e.g., healthcare vs. finance), regionally applicable privacy rules, etc. Finally, the administrator saves the rule (the result of which is shown in FIG. 17). The finished rule is published by the administration node to other nodes as applicable (e.g., proxy node 706 and isolation node 708).

B. Triggering DLP

Suppose Alice creates a Microsoft Word document that contains a list of credit card numbers. She protects the document via a password, which encrypts the document using the ECMA-376 standard, rendering its content unreadable at the network/proxy level (e.g., to a typical proxy, firewall, or other network device). Other document types and encryption schemes can also be used in accordance with techniques described herein. After saving the document, Alice attempts to exfiltrate it by visiting a website to which it can be uploaded. In this example, the website is a DLP test website (dlptest.com). Other examples of sites that she could use include box.com, dropbox.com, onedrive.com, etc.

Figure 18:
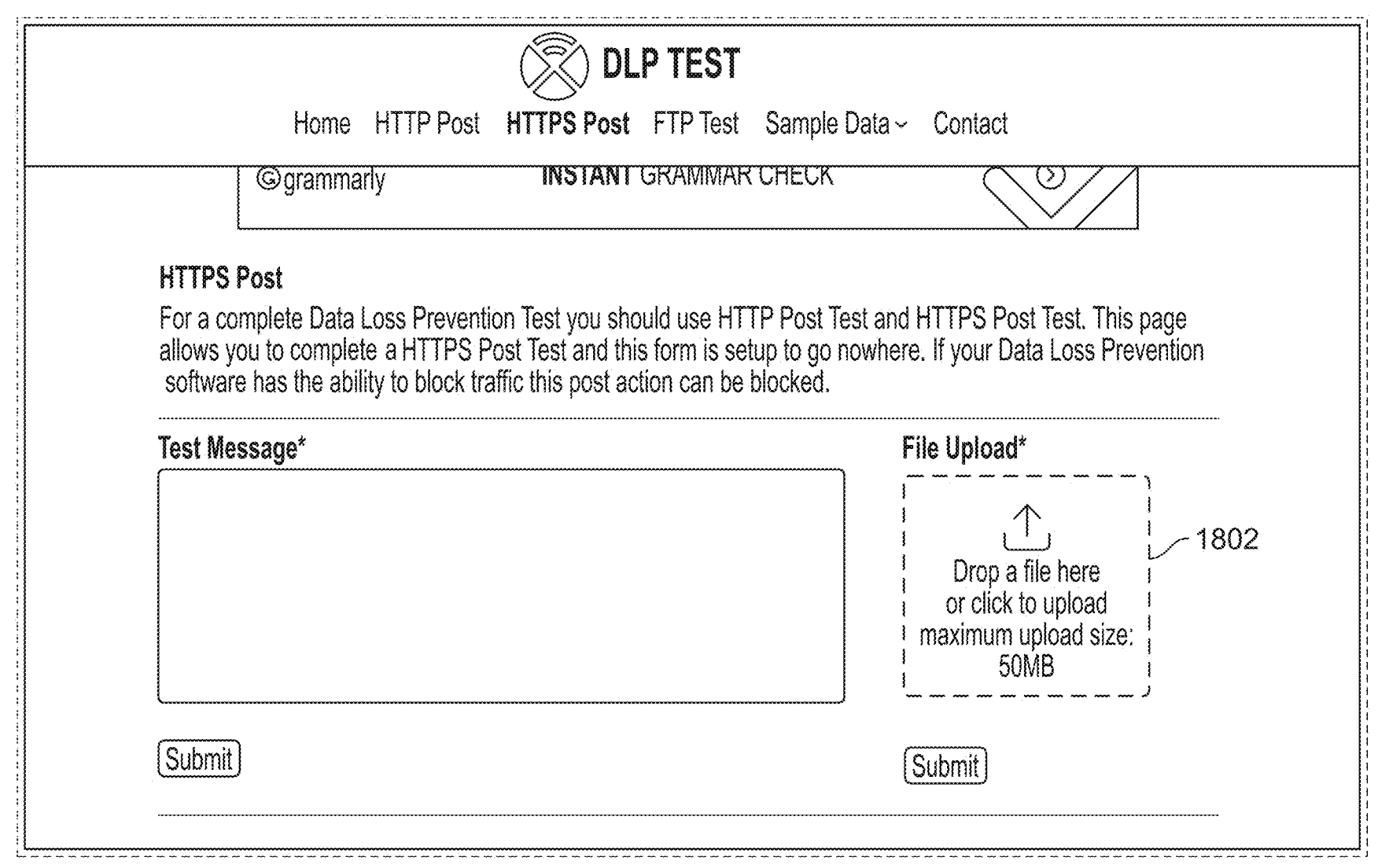

When Alice uses client 704 to access dlptest.com with her browser (via surrogate browsing system 702), the site is automatically isolated (e.g., in isolation container 738). An example of the upload interface of dlptest.com is shown in FIG. 18. When Alice clicks on region 1802, or drags the Word document to region 1802, surrogate browsing system 702 will identify that dlptest.com is requesting a file upload. It communicates (via the thin client) with her browser to initiate the file upload to isolation container 738 (via a standard POST). At this point, no portion of the file has been transmitted to dlptest.com. This prevents any complex/obfuscated protocols (e.g., employed by the remote website) from hiding the data, allowing for full inspection of the upload between client 704 and isolation container 738.

Figure 19:
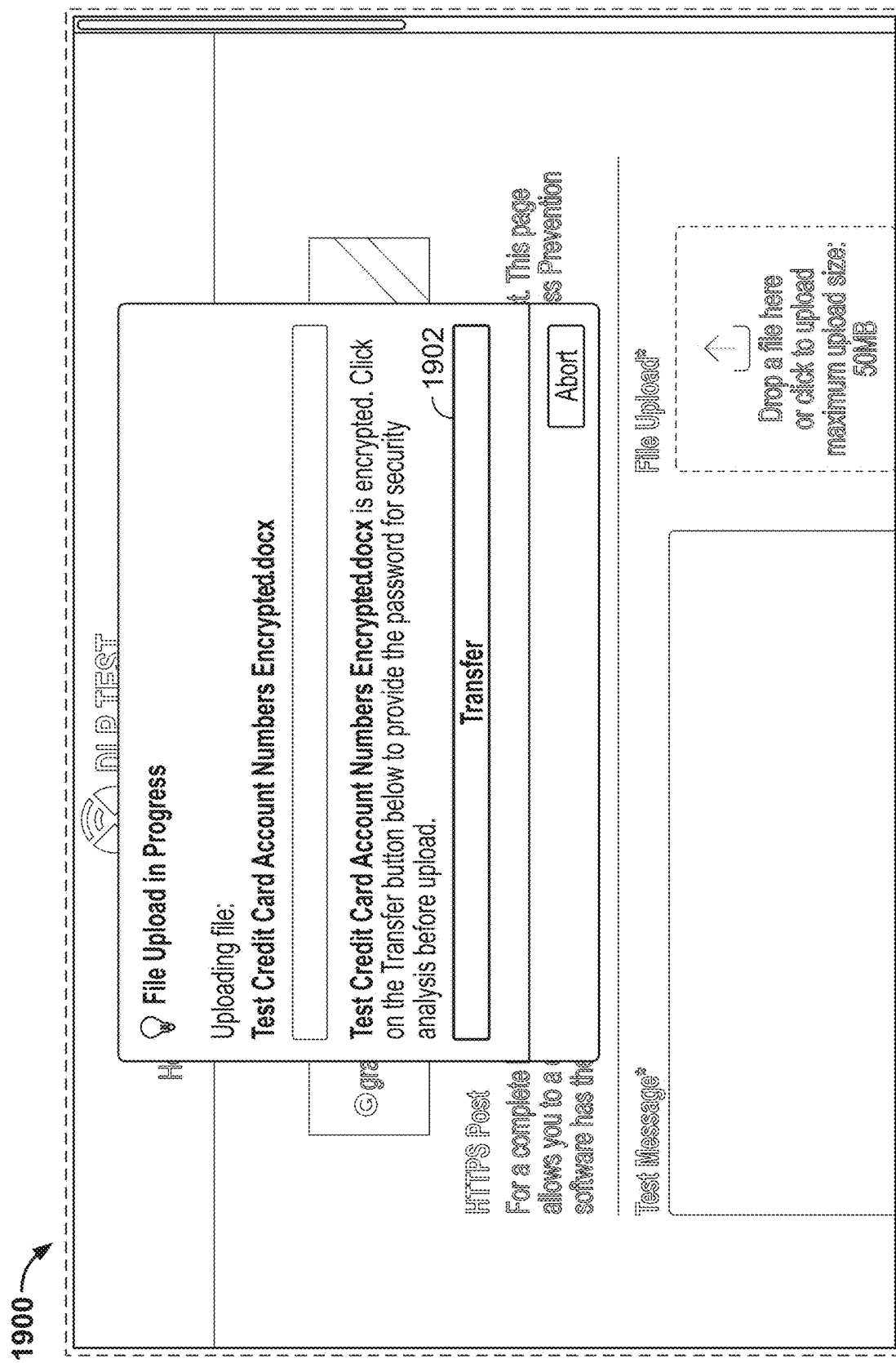
FIG. 19 illustrates an example of an interface.
Figure 20:
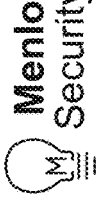
FIG. 20 illustrates an example of an interface.

When the file upload is completed from client 704 to isolation container 738, as described above, the isolation container will notify file server 748. File server 748 identifies that the uploaded file is an encrypted file. Because surrogate browsing system 702 controls the client browser and the response to the remote website, and also has the entire file, system 702 (e.g., via file server 748 which also includes web server functionality) is able to prompt Alice (via the thin client) for the password needed to decrypt the file. An example of such a prompt, rendered in an interface, is shown in FIG. 19. If Alice clicks on region 1902, she will be presented by surrogate browsing system 702 with a password submission interface such as is shown in FIG. 20. The interface can be customized by an administrator to include an applicable corporate logo, custom text, etc. (stored as static resources 732), to help Alice be confident that the password request is not a phishing attempt (e.g., by dlptest.com). Further, information such as the destination (e.g., dlptest.com) is shown in interface 2000 to help Alice confirm that the site to which she is attempting to upload the file is indeed the location she is intending to upload to.

If Alice is unable to supply a valid password (or clicks cancel) during the upload process, the file upload can be blocked (or allowed but with additional logging, notifications sent, etc., as applicable) as configurable by an administrator. Further, as applicable, system 702 can attempt to decrypt the file without Alice's password (e.g., where the file is protected with weak encryption and can be brute forced.) If the correct password is entered, the file is decrypted within isolation container 738 (or other appropriate location within surrogate browsing system 702, such as a temporary container used by system 702 while analyzing the file) and further content inspection can take place before the file starts to upload to the dlptest.com website. Examples of such content inspection include identifying malware present in the decrypted file, capturing the decrypted file and pushing it to a customer owned archive store and/or customer provided email address, examining the document for attempted data exfiltration, and pushing the document out via a REST API to a customer specified system (which can return back a modified version of the file, e.g., that has parts redacted, removed, modified, or watermarked which will replace Alice's original file during upload to the external website). Further, different rules can be applied in different contexts, e.g., allowing Alice to upload her document to an internal website based on policy, while preventing Alice from uploading the same document to an external website. In addition, in some cases, a given encrypted file may include within it additional encrypted files (e.g., an encrypted ZIP file containing another encrypted ZIP file, containing an encrypted document). As checks are performed by surrogate browsing system 702, Alice can be prompted to supply passwords for any additionally encountered encrypted files which can in turn be checked as well.

Figure 21:
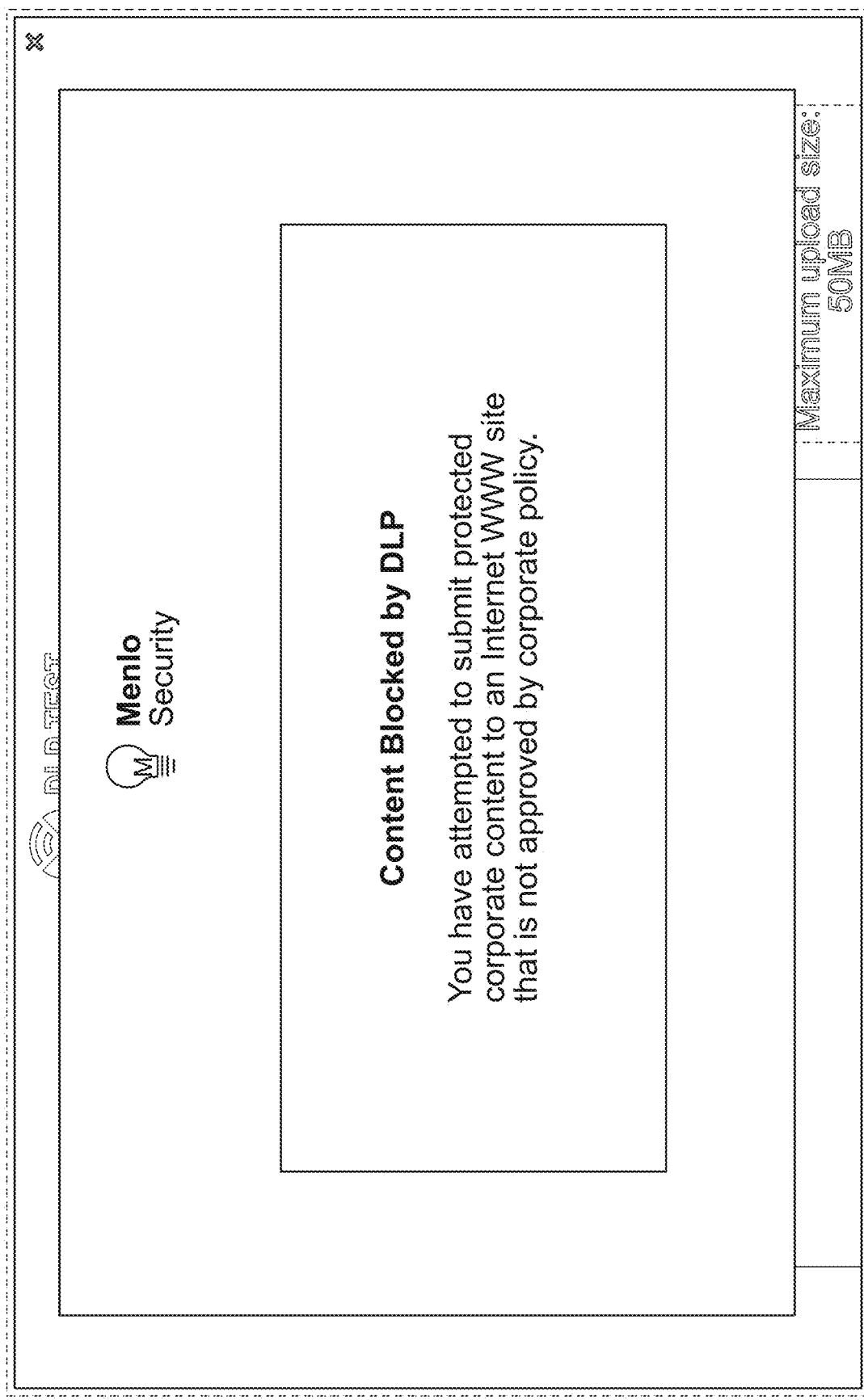
FIG. 21 illustrates an example of an interface.
Figure 22:
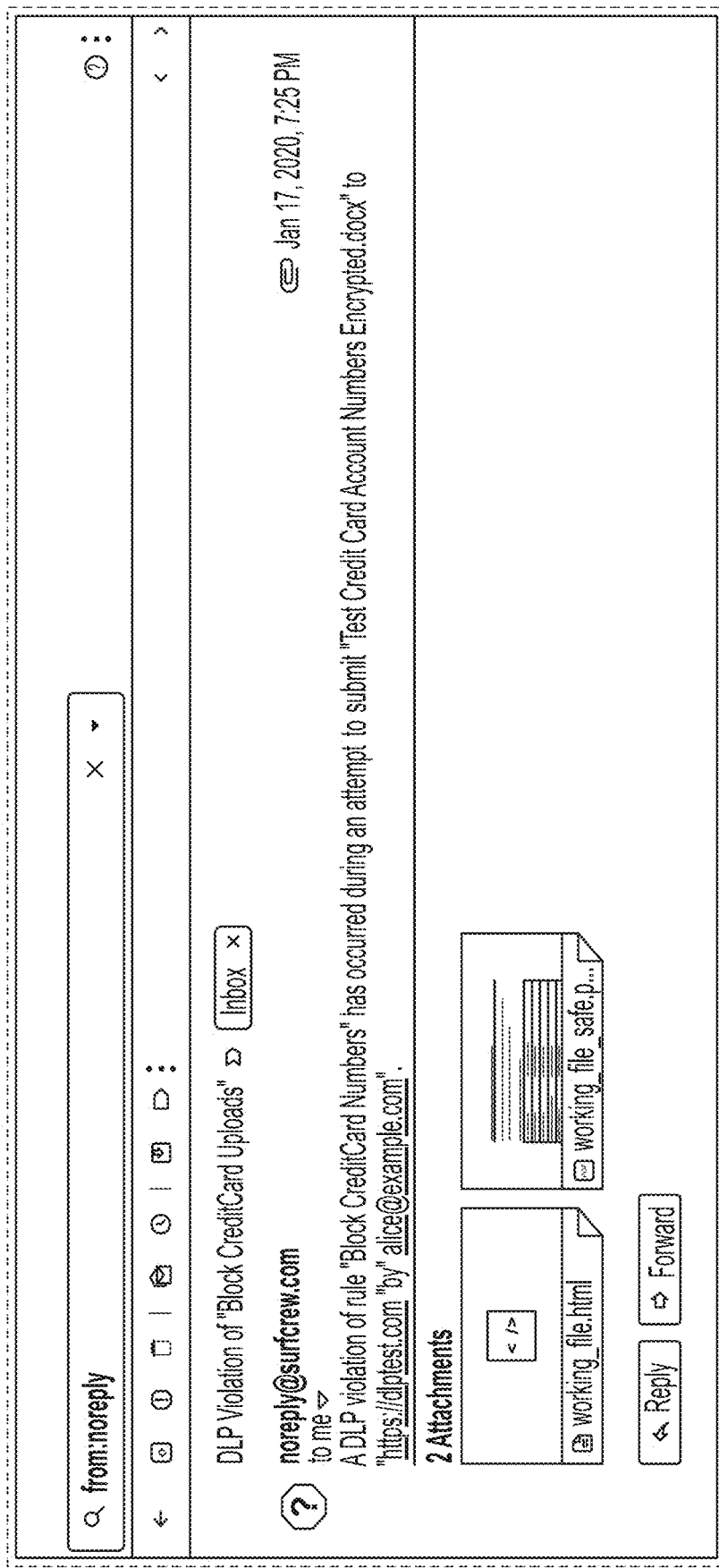
FIG. 22 illustrates an example of an email notification.

In the example shown in FIG. 21, Alice has provided the correct password for the document to surrogate browsing system 702. After decryption, surrogate browsing system 702 determines that contents of the file (i.e., credit card numbers) trigger the DLP rule shown in FIG. 17 and blocks the upload accordingly. In addition to notifying Alice that the file upload is blocked by policy, additional actions can also be taken as specified by the rule (e.g., logging, email notification, etc.). An example of a notification email that can be sent to auditors is shown in FIG. 22 and such notification can include attachments (e.g., including a (decrypted) copy of the file, a screenshot of the file, etc.) as applicable.

C. Example Workflow

Figure 23:
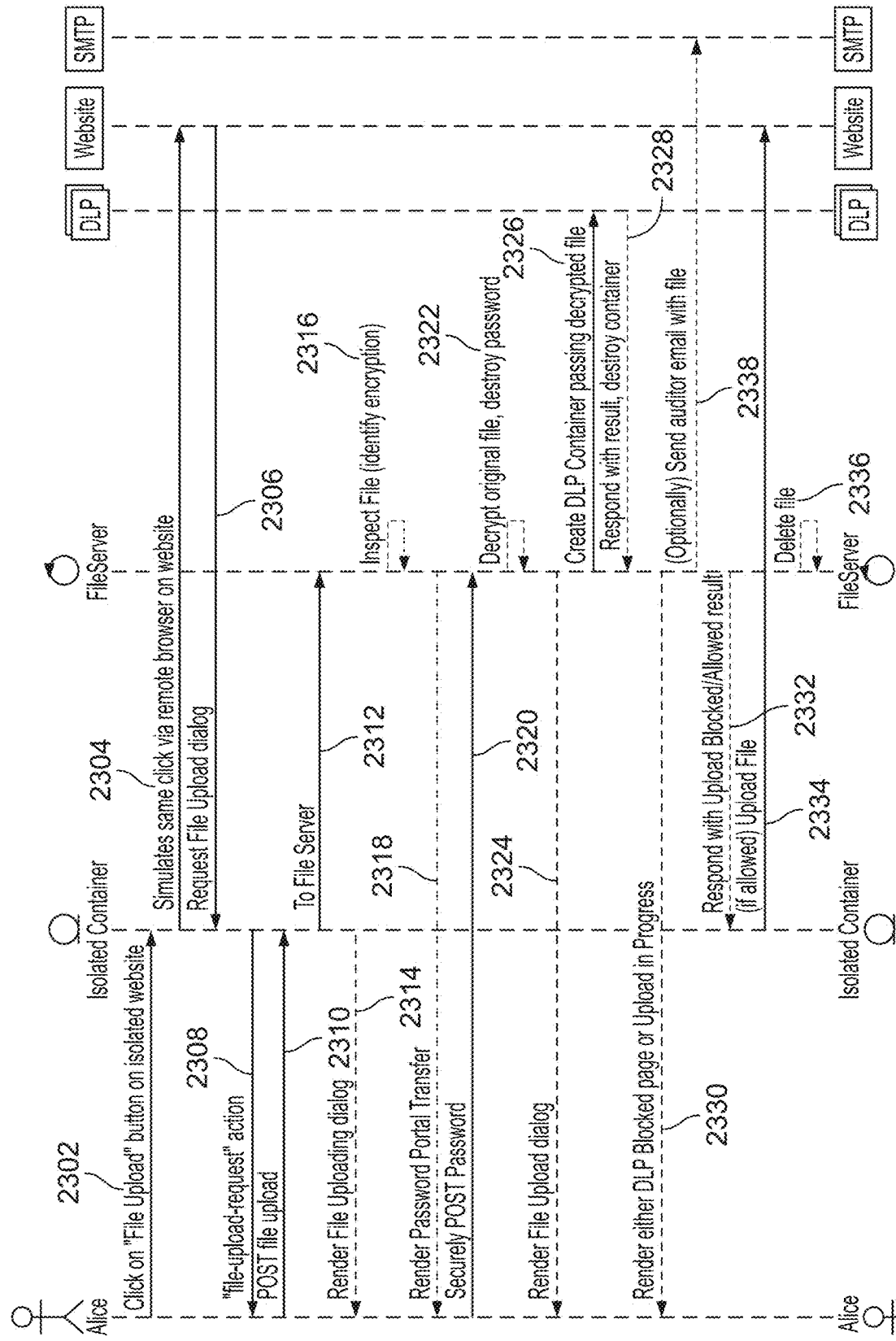
FIG. 23 is a flow diagram that illustrates a file upload.

FIG. 23 is a flow diagram that illustrates a file upload. First (2302) a user (e.g., Alice) clicks on a file upload button on an isolated website, which is intercepted by the isolated container. The isolated container simulates the same click to the remote website (2304). The remote website responds with a request file upload dialog (2306), which is passed on by the isolated container to Alice's client (2308). Alice selects a file (e.g., using a file chooser), which results in her browser performing a POST file upload (2310) from her browser to the isolated container. Once the upload is complete, the isolated container informs the file server (2312) which inspects the file and identifies that it is encrypted (2316). The file server, as it is also a web server, provides a password submission portal to Alice's browser (2318). After entering a password, her browser performs a POST of the password to the file server (2320). The file server uses the password to decrypt the file (2322), creates a container for analyzing the decrypted file (2326), analyzes the decrypted file, and responds with analysis results (2328), while displaying a file upload dialog to Alice (2324). Based on results of the analysis, either an upload progress bar, or a block message (or another appropriate message) is shown to Alice (2330). Further, as applicable, an auditor email can be sent (2338). The analysis result (e.g., block or allow) is provided by the file server to the isolated container (2332). If the upload is allowed, the isolated container provides the file to the website (2334). When processing is complete, the file server deletes the file (2336).

Figure 24:
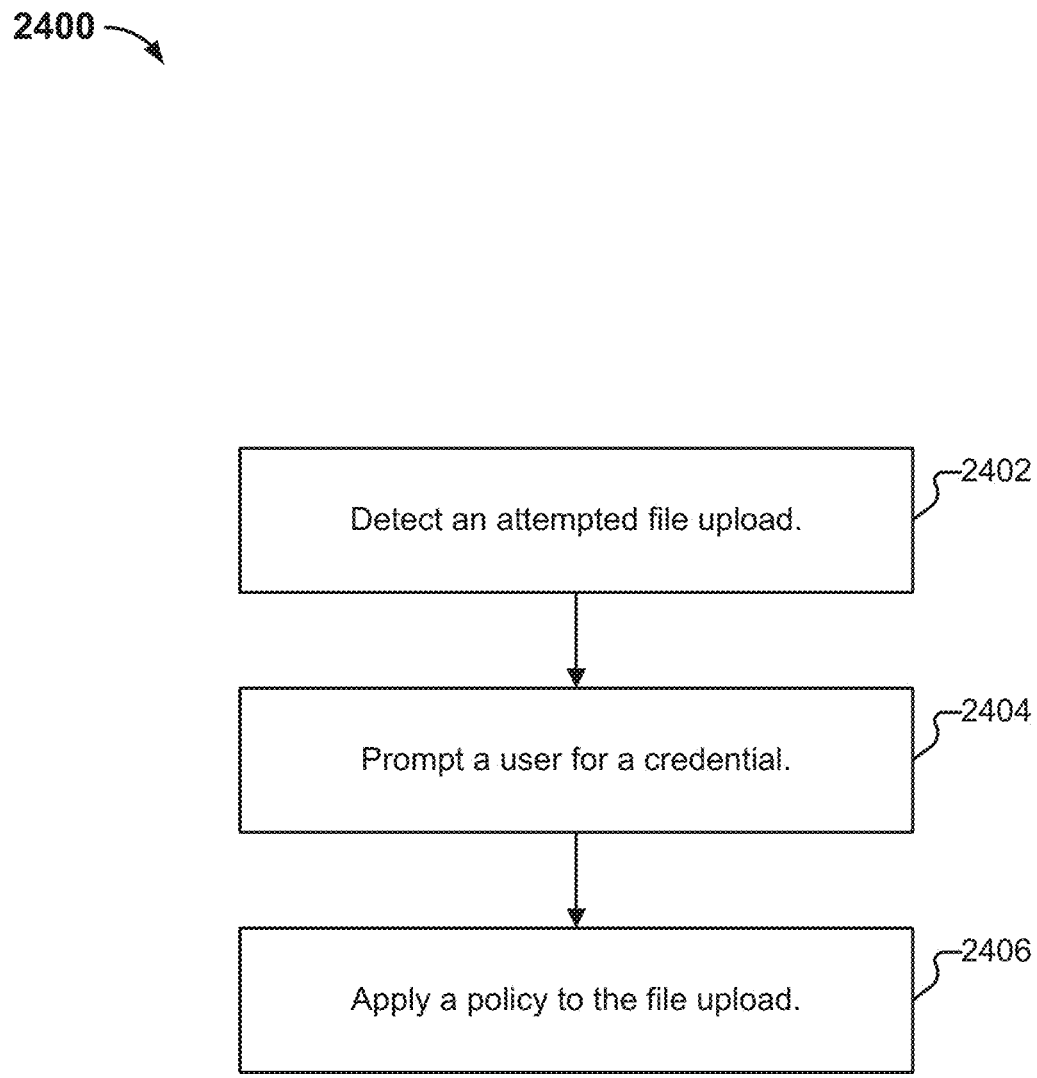
FIG. 24 illustrates an embodiment of a process for providing DLP to file uploads.

FIG. 24 illustrates an embodiment of a process for providing DLP to file uploads. In various embodiments, process 2400 is performed by surrogate browsing system 702. The process begins at 2402 when an attempted file upload is detected. An example of such file detection occurs when an isolation browser receives a request file upload dialog from a remote website (e.g., at 2306 in FIG. 23). At 2404, a user is prompted for a credential. An example of such prompting occurs when surrogate browsing system 702 provides Alice with interface 1900 shown in FIG. 19. Finally, at 2406, a policy is applied to the file upload. As one example, if the user provides a valid credential (e.g., that decrypts an encrypted file) and any applicable checks performed on the file succeed (e.g., no DLP or other violations are found), at 2406, the file is uploaded by surrogate browsing system 702 to the remote website. As another example, if the user fails to provide a credential, clicks cancel, etc., the file upload attempt can be terminated. As yet another example, if the user provides a credential, but the file is determined to violate one or more policies, appropriate actions can be taken, such as notifying an auditor, alerting the user that the file upload is blocked, etc.

V. Secure Archive Explorer

FIG. 25 illustrates an example of a user (also referred to herein as "David") browsing a website that includes a variety of downloadable files. The files shown are a mixture of individual files (e.g., a single PDF document, a single Word document, or a single executable) and archives (e.g., in the .zip, .7z, .arj, or .bz2) format. If David downloads and opens (or, as applicable, executes) one of the files, and that file is malicious, David's client device could be compromised. An encrypted archive is a file that contains other files that have been encrypted by the program creating the archive (e.g., an encrypted .zip file). Separately, an archive can contain files such as Microsoft Office or PDF files that have been encrypted using the application (e.g., Microsoft Word) and/or can contain additional encrypted archives.

Two traditional approaches to protecting users from malicious file downloads are through the use of antivirus software, either deployed at the proxy level or on the client device. Unfortunately, both approaches suffer when confronted with files (whether single files or archives) that are encrypted, because they are unable to decrypt all of the encryption layers as they encounter them, and in general have to make a decision whether to block or allow the file based on the fact that they cannot determine anything about it other than it being encrypted.

In the proxy approach, there is no opportunity to decrypt the file before providing it to the end user. A proxy administrator must thus make a decision to either allow or block files that cannot be scanned. If the decision is to block such files, it can lead to a poor end user experience because many legitimately encrypted files/archives will be blocked unnecessarily. If the decision is to allow such files through, the security risk posed by malicious file downloads remains. For antivirus software deployed at the endpoint, scanning can potentially be performed after the end user decrypts the file. For example, if the user downloads an encrypted .zip file which contains five additional unencrypted files, the antivirus scanner can potentially scan those five files in response to the user decrypting the .zip file (e.g., by intercepting them as they are extracted after decryption by the zip program).

Unfortunately, for many file types (e.g., Microsoft Office documents or PDFs), such decryption does not take place until after the associated application is launched to open the file (as the application is responsible for handling decryption). At this point, it is too late for the antivirus software to intercept/scan the files.

Using embodiments of techniques described herein, protection against potentially malicious encrypted archives is provided. As will be described in more detail below, a surrogate browsing platform (e.g., an embodiment of system 702) can capture an archive download prior to facilitating downloading to a client device. Via an archive explorer interface, the user is able to navigate through the encrypted archive, including while its contents are being scanned by the platform. The user can provide passwords to decrypt each file and/or level (to an arbitrary depth) within the archive to allow complete scanning of the archive contents. Further, encrypted files within the encrypted archive can be decrypted and rendered via the surrogate browsing platform as a remote preview, allowing the user to view documents (e.g., Office documents and PDFs) remotely (whether encrypted or not) rather than or prior to downloading local copies. And, individual files (or sets of files) from the archive can be selectively previewed and downloaded, if desired, without having to download the entire archive. If some portion of the archive is encrypted (for which the user does not know or does not wish to provide the password), or if a portion of the archive is malicious, those specific portions of the archive can be blocked without blocking access to the rest of the archive content.

FIG. 26 illustrates an example of David visiting the website depicted in FIG. 25, but this time using an embodiment of surrogate browsing system 702. In this example, David has prepended "safe.menlosecurity.com" to the URL shown in region 2502 of the interface shown in FIG. 25. As a result, David is not directly interacting with the website but instead via a surrogate browser (e.g., in accordance with techniques described above).

Suppose David scrolls down the page depicted in FIG. 26 (arriving at the view depicted in FIG. 27) and clicks on link 2702. The isolation container assigned to him (e.g., isolation container 738) fully downloads the file to platform 702, where it is then processed by file server 748. In particular, file server 748 identifies the file as an archive (e.g., a zip file) and then determines whether it is encrypted or not. If it is not encrypted, it applies an applicable content inspection policy (e.g., determining whether the zip file has a known malicious hash or not, and if not, opening the file and scanning the contents with an applicable antivirus scanner). If the zip and its contents pass any applicable checks, then platform 702 will pass the zip file to David's browser, where native browser functionality in David's browser will engage (e.g., to ask him where he would like to save the file).

Figure 28:
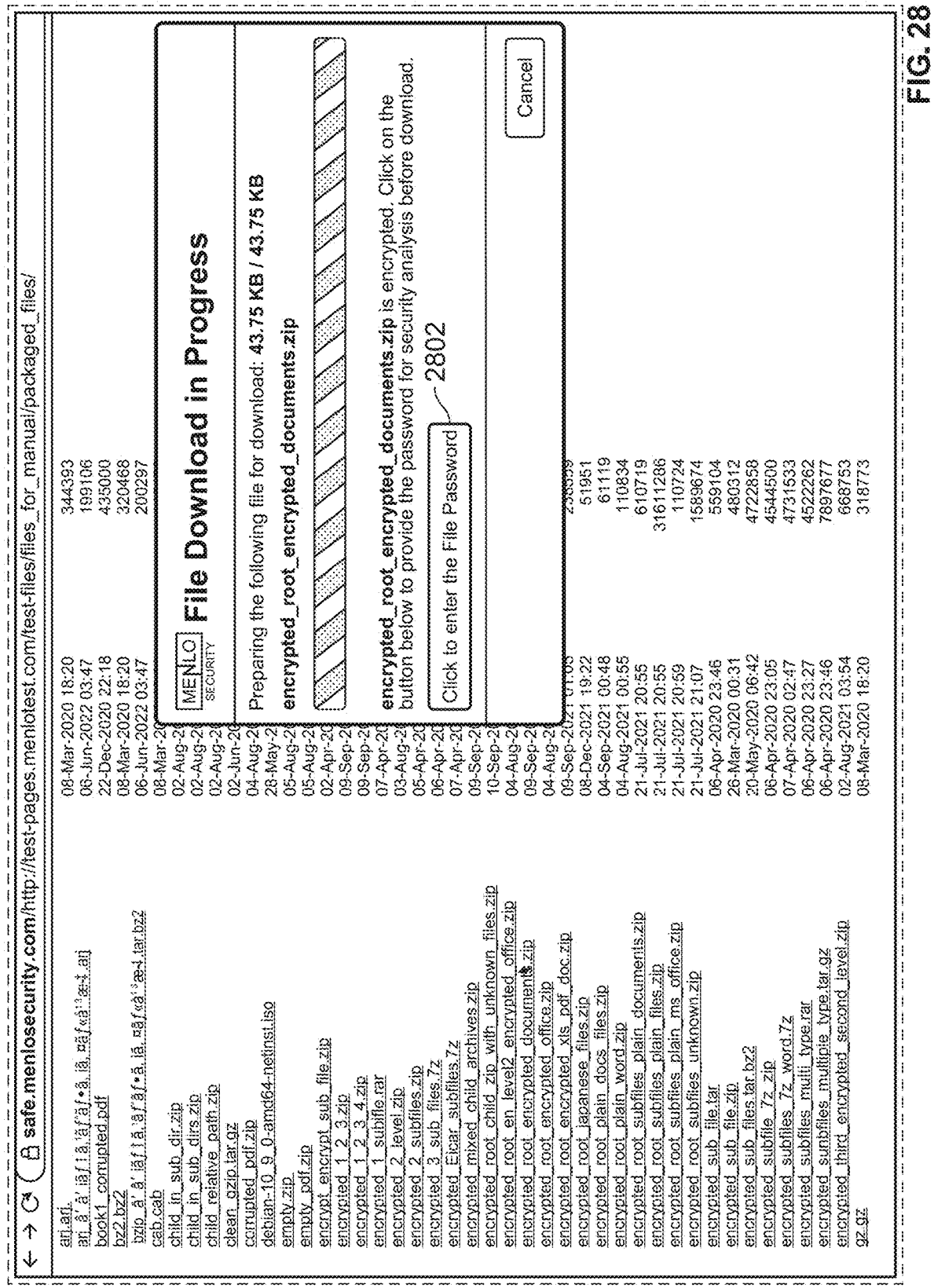
FIG. 28 illustrates an example of the user visiting a website using a surrogate browsing system.
Figure 29:
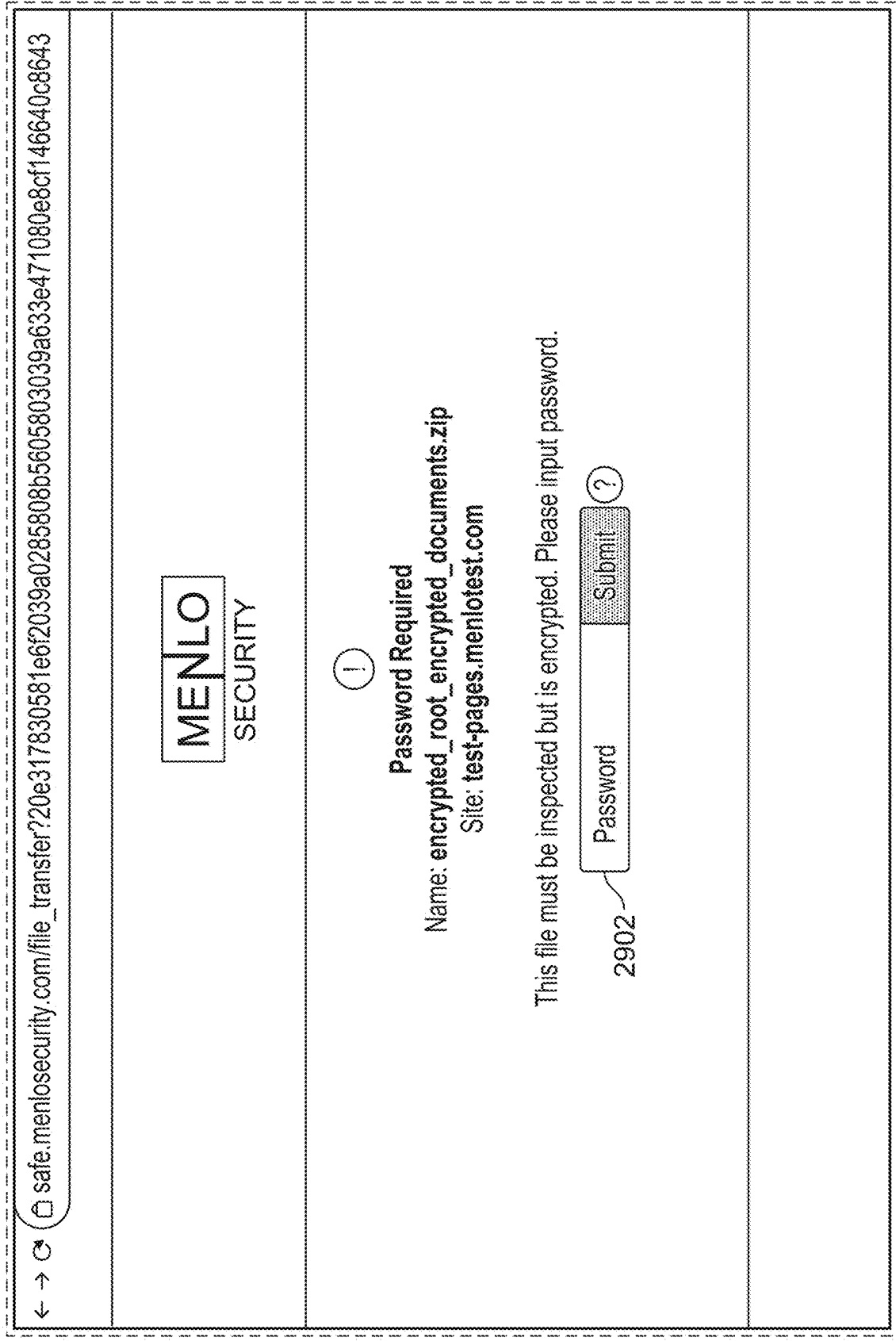
FIG. 29 illustrates an example of the user visiting a website using a surrogate browsing system.
Figure 30:
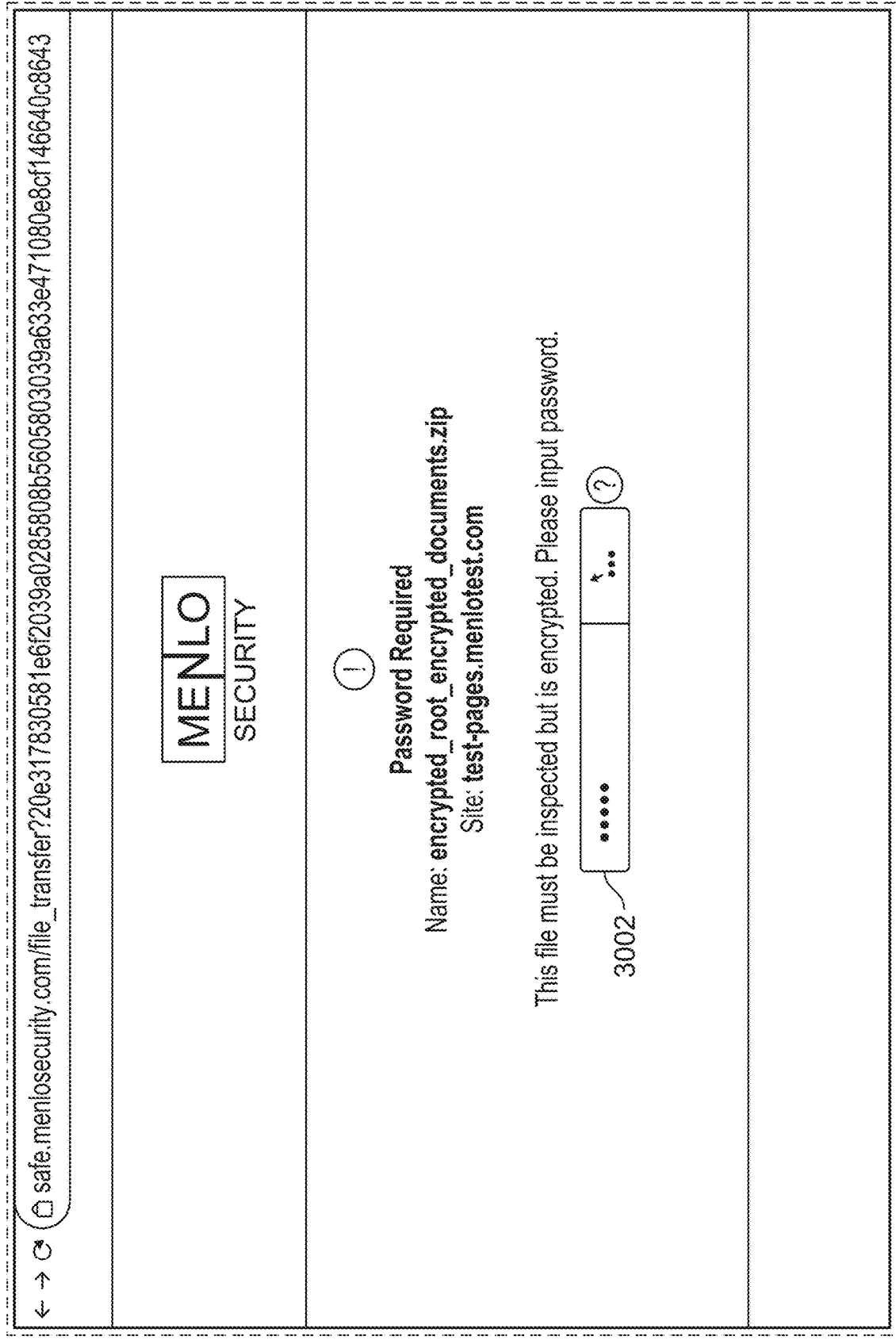
FIG. 30 illustrates an example of the user visiting a website using a surrogate browsing system.
Figure 31:
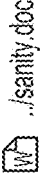
FIG. 31 illustrates an example of the user visiting a website using a surrogate browsing system.

Suppose that the file accessible via link 2702 is an encrypted container (i.e., the zip file itself encrypted). During processing, file server 748 will detect this and determine whether the type of encryption used is supported by platform 702. If not, further access to the file can be blocked (e.g., based on an applicable policy). If the type of encryption is supported, then platform 702 can prompt David to provide a password for the file. An example of this is shown in FIG. 28, where a dialog is displayed in David's browser, indicating that the file he is attempting to access is encrypted, and asking that he provide the password (in region 2802). If David clicks the button shown in region 2802, he will then be presented with a dialog, such as is shown in FIG. 29. As shown in FIG. 30, David provides a password in region 3002. File server 748 then uses the provided password to decrypt the file and provides the contents as a directory listing, by an archive isolation viewer 752, responsible for providing an interactive user interface to David's browser, as shown in FIG. 31. An example way of implementing archive isolation viewer 752 is by using a Node.js frontend for the backend and a combination of JavaScript and HTML for the frontend.

Figure 32:
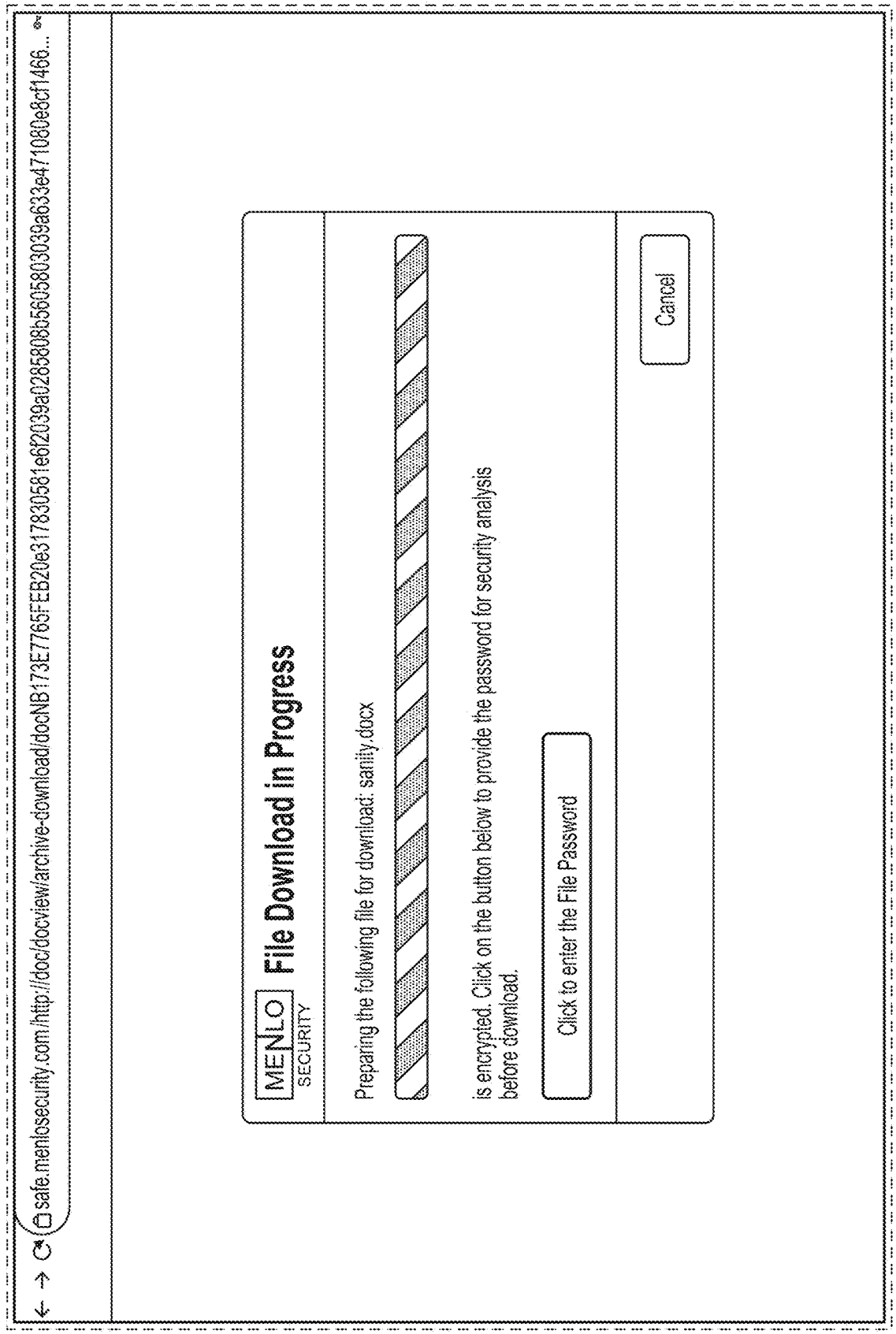
FIG. 32 illustrates an example of the user visiting a website using a surrogate browsing system.
Figure 36:
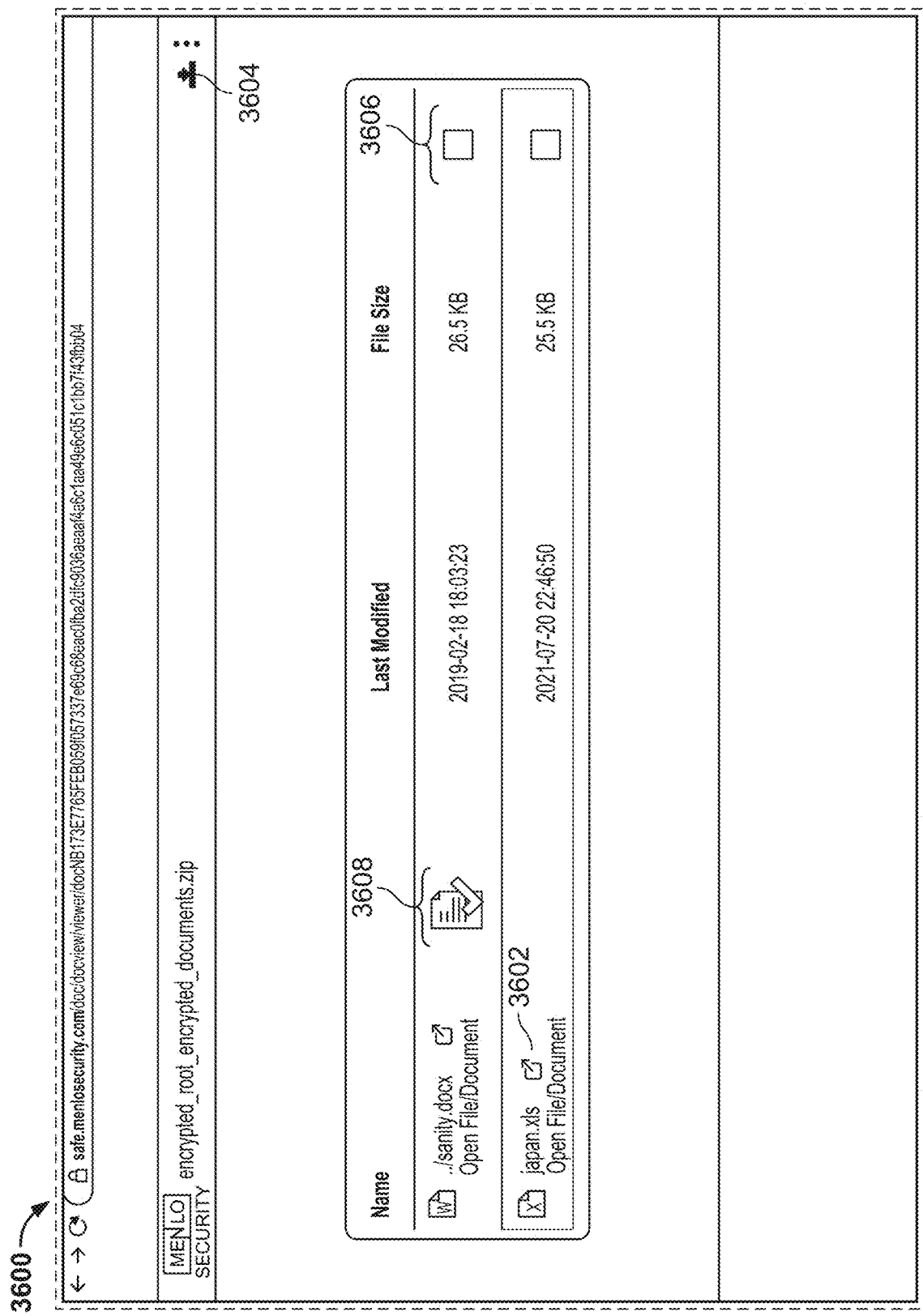
FIG. 36 illustrates an example of the user visiting a website using a surrogate browsing system.

Each of the files shown in FIG. 31 has an associated identifier. If David clicks on one of the file links (e.g., 3102 or 3104), file server 748 processes the file and, either scans the file (and applise applicable policy) or if encrypted, will again prompt David for the password. In this example, suppose that David clicks on link 3102, which is an encrypted Microsoft Word document. As shown in FIG. 32, David is prompted by platform 702 for the password to the file. When David enters the password to the file in region 3302 (shown in FIG. 33), platform 702 can decrypt the file and scan it. While the file is being scanned, platform 702 can render a copy of it to David in interface 3400. This copy of the document is shown as being rendered in David's browser (via platform 702) but the corresponding original Word document file has not been downloaded to David's computer. In this example, the scan completes and determines that the document is not compromised (as shown in region 3502 of FIG. 35). David can continue to interact with a copy of the document in his browser, or, now that it has been determined to be safe, can also download a copy to his client, by clicking in region 3504. If the file had been determined to be unsafe, David could still download a safe copy of it by clicking on region 3506 (which converts the Word document into a PDF document) or can opt to download a PDF version (also available if the file is determined to be safe).

If David returns back to the interface shown in FIG. 31 (e.g., by clicking on the back button in his browser), he will see that a checkmark has been placed next to the file that he viewed online, indicating that it has been checked and is safe (as illustrated at 3608). If file 3602 is also encrypted, if David would like to download it as well, he can click on it in interface 3600 and have it checked (after supplying the password). If file 3602 is also confirmed to be safe (either after David has supplied the password, or if it was not encrypted and was checked by platform 702), David will be given the option to download the entire .zip file (as all of the contents have been checked) by clicking region 3604 or can download any of the individual files he would like (e.g., by clicking the checkboxes in region 3606 corresponding to the files he wishes to download).

In various embodiments, platform 702 checks unencrypted files within archives and only those encrypted files for which a user has specifically indicated a desire to access. In other embodiments, platform 702 is configured to scan through the contents of the archive, identify any encrypted files, and prompt the user for passwords for each of them. As applicable, platform 702 can temporarily cache any provided passwords and automatically try them against any encrypted files included in the archive.

If the archive David is exploring contains within it additional archives (e.g., the .zip he is browsing contains one or more .zips within it), he can navigate through arbitrary levels, into those .zips. If the contained .zips are encrypted, platform 702 will prompt him for the password, keeping track of which files have been decrypted and scanned, and ultimately allowing him to download any/all files that have been successfully scanned (either because they were not encrypted, or were decrypted) and determined to be clean.

In various embodiments, module 746 is configured to log each action taken with respect to a given archive file (e.g., that David has attempted to access it, that David wishes to open particular files within it, whether those files are encrypted, the results of scanning those files, and so on).

Figure 37:
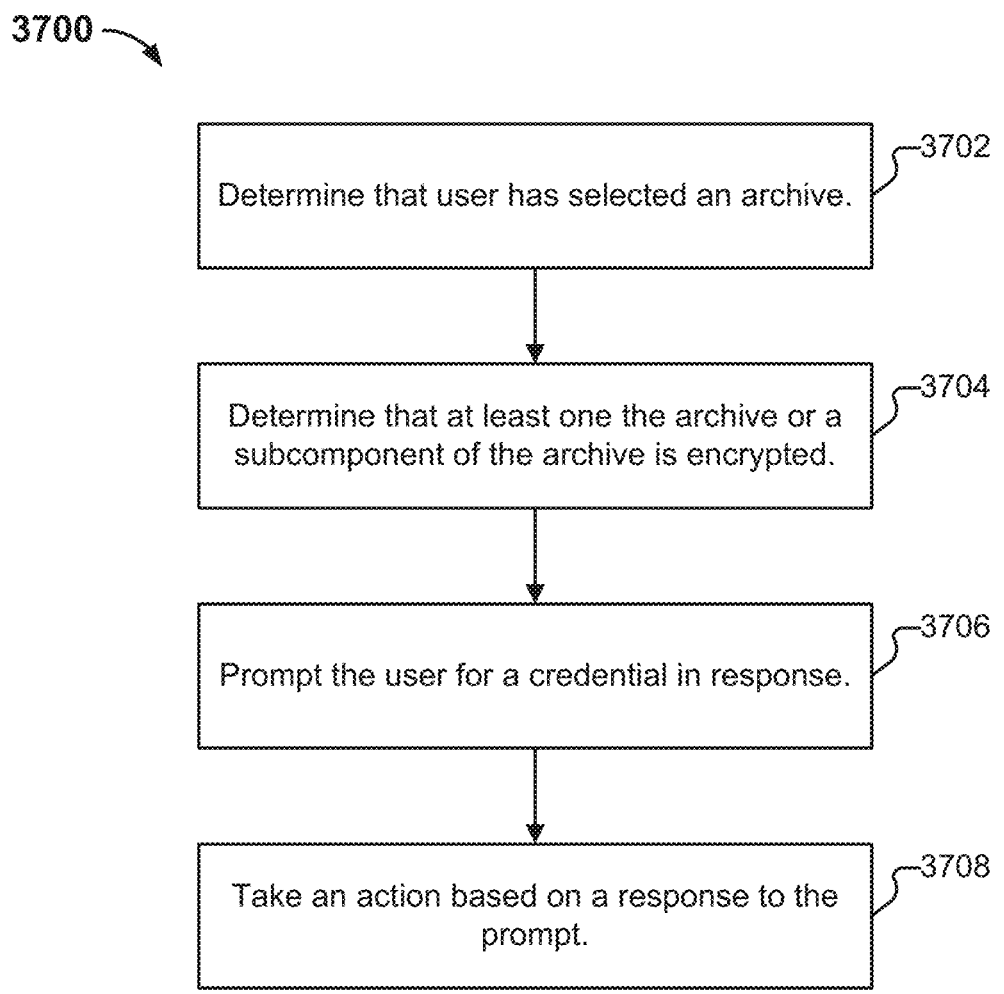
FIG. 37 illustrates an example of a process for providing a secure archive explorer.

FIG. 37 illustrates an example of a process for providing a secure archive explorer. In various embodiments, process 3700 is performed by surrogate browsing system 702. The process begins at 3702 when a determination is made that a user has selected an archive. An example in connection with such a determination is shown in FIG. 27 when the user clicks on link 2702. At 3704, a determination is made that at least one of the archive or a subcomponent (e.g., a file or another archive) of the archive is encrypted, in accordance with techniques described above. As illustrated in FIG. 28, in this example, the archive itself is encrypted, and the user is prompted for a password (as illustrated in FIG. 29) at 3706. Based on the user's response (e.g., providing a correct credential, providing a wrong credential, or providing no credential) an action is taken at 3708.

In some embodiments, file server 748 keeps track of the archive, on a per session basis, using a unique identifier (e.g., a generated UUID). Contents of the archive and their states (e.g., selected for download, unencrypted, encrypted but password has been provided, scanned, etc.) are associated with the archive's UUID. In some embodiments, the UUID incorporates or is associated with an identifier of the requester (e.g., Alice or Bob) or the requester's session such that if two different users attempt to access the same archive, two UUIDs are generated—one for Alice's request and one for Bob's request. If Alice has the password for a particular archive, but Bob does not, they will each receive different experiences when interacting with the archive. For example, Alice may be given the opportunity to download all files in the archive (assuming they are determined to be safe) and Bob will be given the opportunity to download only those portions of the archive that are not encrypted. As another example, if components of the archive make use of different passwords (e.g., a first file is encrypted with a password known to Alice and a second file is encrypted with a password known to Bob), each user can be presented the opportunity to download (or otherwise access, e.g., with an in-browser file viewer) only the applicable portions of the archive.

In various embodiments, an interactive archive viewer allows users to view/open all permitted files inside an archive, including password protected documents and nested archives, while remaining in isolation. Each file or archive can be opened in a document viewer (e.g., in a new tab). Allowed files within an archive can be downloaded as "naked" documents (e.g., native browser) once the content is determined to be safe. Users can open nested archives (including password protected nested archives), which, in some embodiments, open in a new tab, displaying files/any additional nested archives contained within. Child/nested archives can also be opened in a current active tab in some embodiments. Any file types with an action of block (as configurable by an administrator) are, in some embodiments, blocked at click-time with a block page. In other embodiments, such file types are instead greyed out and not clickable. In various embodiments, users have the ability to download the original archive if the following conditions are met: (1) the user is permitted to download the original version of the archive; (2) the content is determined to be safe; and (3) the archive does not contain any blocked files or blocked file types. In the event the user is not allowed to download the original version of one or more files included in the archive, even if "original download" is otherwise permitted by the system, that user will not be able to download the original archive. As one example, suppose an archive contains ten files, nine of which are text files, but one of which is an executable. If a policy specifies that users are not allowed to download executable files (or that particular users are not allowed to download executable files), the user can be prevented from downloading the archive (i.e., a file type that is not itself an executable). However, the user can potentially be allowed to download a version of the archive that omits the executable.

An example data structure for storing file metadata is as follows and can be used by file server 748 to track files, owners (e.g., requesters), and origins of the files (e.g., the originating website of the file/archive):

```
file_entry={
    'docid': None,
    'state': None,
    'state_change_time': t,
    'access_time': t,
    'first_download_time': None,
    'event_source': None,
    'file_name': None,
    'file_path': None,
    'file_type': None,
    'mime_type': None,
    'storage_dir': None,
    'current_file_size': 0,
    'expected_file_size': 0,
    'safedocs_url': None,
    'user_id': None,
    'tenant_id': None,
    'browser_id': None,
    'referrer_uri': '',
    'parent_archive_file_id': None,
    'root_archive_file_id': None,
    'is_parent_archive': False,
    'path_in_archive': [ ],
    'complete_path_in_archive': None
}
```

In this structure, there is a link to an immediate parent archive and a root archive, as well as the referrer URI. The user (e.g., Alice) and tenant (e.g., ACME Bank) tenant identifiers are also stored, as well as a browser identifier for tracking purposes. Other users downloading the same file would get their own entries in the metadata store. For example, if Alice opens an archive from a website and navigates through it, she will have a unique set of metadata entries attached to her user/tenant/browser along with unique URLs for her to access the contents of the archive, that are locked to her. If she attempts to share the URL with another user (e.g., Bob), that user will be unable to view the contents using Alice's URL because the other user will have non-matching user/tenant/browser information. Instead, the second user would get a new entry with their own set of identifiers, locked to that user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  determine, at a browser isolation system, that a user has selected, from an interface rendered in a browser executing on a client device, an archive comprising at least one file, wherein the browser isolation system is configured to provide a surrogate browser to facilitate communications between the client browser and the archive, and wherein the archive is hosted by a remote site;

determine, by the browser isolation system, that at least one of the selected archive or a subcomponent of the selected archive is encrypted and in response to determining that the at least one of the selected archive or the subcomponent of the selected archive is encrypted, prompt the user for a credential in the browser; and selectively providing access to the archive, or providing access to a modified version of the archive based at least in part on a security policy applicable to the user and based on the user's response to the prompt; and a memory coupled to the processor and configured to provide the processor with instructions.

2. The system of claim 1, wherein the subcomponent is a file.

3. The system of claim 1, wherein the subcomponent is an additional archive.

4. The system of claim 1, wherein the user is prompted to select a sub-portion of content to download.

5. The system of claim 1, wherein providing access to the modified version of the archive includes determining, for at least some files, which files do not pose a security threat, and offering those files which do not pose a security threat for download to the user.

6. The system of claim 1, wherein, in the event the user's response does not include decryption information, the user is offered the ability to download unencrypted files.

7. The system of claim 1, wherein the processor is further configured to provide a document viewer usable to view the at least one file.

8. The system of claim 1, wherein in the event the system determines that the full contents of the archive do not pose a security threat, the user is provided an ability to download the archive.

9. The system of claim 1, wherein in the event the system determines that the archive includes a file of a prohibited file type, the user is provided an ability to download a portion of the archive that excludes the file of the prohibited file type.

10. The system of claim 1, wherein the processor is further configured to associate the archive with a unique identifier.

11. The system of claim 10, wherein the unique identifier is associated with the user.

12. The system of claim 11, wherein in the event a second user requests the same archive, the same archive will be assigned a second unique identifier, wherein the second unique identifier is associated with the second user.

13. A method, comprising:
   determining, at a browser isolation system, that a user has selected, from an interface rendered in a browser executing on a client device, an archive comprising at least one file, wherein the browser isolation system is configured to provide a surrogate browser to facilitate communications between the client browser and the archive, and wherein the archive is hosted by a remote site;
   determining, by the browser isolation system, that at least one of the selected archive or a subcomponent of the selected archive is encrypted and in response to determining that the at least one of the selected archive or the subcomponent of the selected archive is encrypted, and based at least in part on a security policy applicable to the user, prompting the user for a credential in the browser; and
   selectively providing access to the archive, or providing access to a modified version of the archive based at least in part on a security policy applicable to the user and based on the user's response to the prompt.

14. A computer program product embodied in a non-transitory computer readable medium and comprising computer instructions for:
   determining, at a browser isolation system, that a user has selected, from an interface rendered in a browser executing on a client device, an archive comprising at least one file, wherein the browser isolation system is configured to provide a surrogate browser to facilitate communications between the client browser and the archive, and wherein the archive is hosted by a remote site;
   determining, by the browser isolation system, that at least one of the selected archive or a subcomponent of the selected archive is encrypted and in response to determining that the at least one of the selected archive or the subcomponent of the selected archive is encrypted, and based at least in part on a security policy applicable to the user, prompting the user for a credential in the browser; and
   selectively providing access to the archive, or providing access to a modified version of the archive based at least in part on a security policy applicable to the user and based on the user's response to the prompt.

* * * * *